(12) United States Patent  (10) Patent No.: US 8,998,287 B2
Smith et al.  (45) Date of Patent: Apr. 7, 2015

(54) ROLL TARP SYSTEM

(71) Applicant: Wastequip, LLC, Charlotte, NC (US)

(72) Inventors: Fred P. Smith, Alpine, UT (US);
Nathan H. Morrill, Lehi, UT (US);
Carlson Smith, Bimble, KY (US)

(73) Assignee: Wastequip, LLC, Charlotte, NC (US)

( * ) Notice: Subject to any disclaimer, the term of this patent is extended or adjusted under 35 U.S.C. 154(b) by 0 days.

(21) Appl. No.: 13/840,745

(22) Filed: Mar. 15, 2013

(65) Prior Publication Data

US 2013/0249236 A1 Sep. 26, 2013

Related U.S. Application Data

(60) Provisional application No. 61/613,986, filed on Mar. 22, 2012.

(51) Int. Cl.
B60J 7/08 (2006.01)

(52) U.S. Cl.
CPC ........................................ B60J 7/085 (2013.01)

(58) Field of Classification Search
CPC ........................................................ B60J 7/085
USPC .................................. 296/98, 100.15, 100.18
See application file for complete search history.

(56) References Cited

U.S. PATENT DOCUMENTS

| 3,785,694 | A | | 1/1974 | Sargent |
| 3,829,154 | A | | 8/1974 | Becknell |
| 4,129,331 | A | | 12/1978 | Lawson et al. |
| 4,212,492 | A | | 7/1980 | Johnsen |
| 4,234,224 | A | | 11/1980 | Rosenvold |
| 4,302,043 | A | | 11/1981 | Dimmer et al. |
| RE31,746 | E | | 11/1984 | Dimmer et al. |
| 4,484,777 | A | | 11/1984 | Michel |
| 4,505,512 | A | | 3/1985 | Schmeichel et al. |
| 4,518,193 | A | | 5/1985 | Heider et al. |
| 4,529,098 | A | | 7/1985 | Heider et al. |
| 4,657,062 | A | | 4/1987 | Tuerk |
| 4,673,208 | A | | 6/1987 | Tsukamoto |
| 4,691,957 | A | | 9/1987 | Ellingson |
| 4,715,089 | A | | 12/1987 | Schema |
| 4,834,445 | A | | 5/1989 | Odegaard |
| 4,915,439 | A | | 4/1990 | Cramaro |
| 5,002,328 | A | | 3/1991 | Michel |
| 5,180,203 | A | | 1/1993 | Goudy |
| 5,183,284 | A | * | 2/1993 | Paplinski ...................... 280/508 |
| 5,328,228 | A | | 7/1994 | Klassen |
| 5,482,347 | A | | 1/1996 | Clarys et al. |
| 5,762,002 | A | | 6/1998 | Dahlin et al. |
| 5,823,067 | A | | 10/1998 | Clarys et al. |

(Continued)

OTHER PUBLICATIONS

Shurco, 4500 Series Electric Tarp System, 4500 Series, 2 pg. brochure, date unknown.

(Continued)

Primary Examiner — Jason S Morrow
(74) Attorney, Agent, or Firm — K&L Gates LLP

(57) ABSTRACT

A roll tarp system is provided which includes a container, a roll pipe, a tarp sized to cover an open top of the container, a power mechanism for rolling the roll pipe from a closed position in which the tarp covers the open top to an open position in which the open top is exposed, and an arm assembly having a flexible arm portion. The arm assembly biases the roll pipe toward the closed position when the roll pipe is in the open position.

24 Claims, 22 Drawing Sheets

(56) References Cited

U.S. PATENT DOCUMENTS

| | | | |
|---|---|---|---|
| 5,924,758 A | 7/1999 | Dimmer et al. | |
| 6,070,491 A | 6/2000 | Claudio et al. | |
| 6,135,534 A | 10/2000 | Schmeichel | |
| 6,142,553 A | 11/2000 | Bodecker | |
| 6,199,935 B1 | 3/2001 | Waltz et al. | |
| 6,206,449 B1 | 3/2001 | Searfoss | |
| 6,338,521 B1 | 1/2002 | Henning | |
| 6,513,856 B1 * | 2/2003 | Swanson et al. | 296/98 |
| 6,595,594 B2 | 7/2003 | Royer | |
| 6,641,199 B1 | 11/2003 | Hicks | |
| 6,783,168 B2 | 8/2004 | Searfoss | |
| 6,805,395 B2 | 10/2004 | Royer | |
| 6,837,532 B1 | 1/2005 | Hicks | |
| 6,857,682 B2 | 2/2005 | Eggers et al. | |
| 6,886,879 B2 | 5/2005 | Nolan et al. | |
| 6,916,060 B2 | 7/2005 | Searfoss | |
| 6,926,337 B2 | 8/2005 | Poyntz | |
| 6,978,732 B1 | 12/2005 | Jirak | |
| 6,979,043 B2 | 12/2005 | Leischner et al. | |
| 7,032,950 B2 | 4/2006 | Eggers et al. | |
| 7,188,887 B1 | 3/2007 | Schmeichel | |
| 7,246,838 B2 | 7/2007 | Searfoss | |
| 7,350,556 B2 | 4/2008 | Pernicano | |
| 7,413,234 B2 | 8/2008 | Smith et al. | |
| 7,506,912 B2 | 3/2009 | Royer | |
| 7,513,561 B2 | 4/2009 | Royer | |
| 7,611,187 B1 | 11/2009 | Rogers | |
| 7,726,720 B2 | 6/2010 | Searfoss | |
| 7,841,642 B2 | 11/2010 | Schaefer | |
| 8,496,283 B1 * | 7/2013 | Schmeichel et al. | 296/98 |
| 2002/0021018 A1 | 2/2002 | Royer | |
| 2010/0207410 A1 * | 8/2010 | Leon | 294/82.1 |
| 2013/0241230 A1 * | 9/2013 | Knight et al. | 296/98 |
| 2013/0300147 A1 * | 11/2013 | Schmeichel et al. | 296/98 |
| 2013/0313855 A1 * | 11/2013 | Schmeichel | 296/98 |

OTHER PUBLICATIONS

Aero Industries 2 pg. brochure, Get it Done With the Flip of a Switch, Power Lock, 2011.
Mountain Tarp, Tarp-N-Go Systems, 12 pgs., Installation Manual, 2007.
Roll rite, Rear Return System, Tarp Return, 1 pg., date unknown.
Agri-Cover Roll Tarp Systems, 1 pg. brochure, date unknown.
LCS-Load Covering Solutions, Wrap'N Roll Side Roll Covers for Side Dump Trailers, 1 pg., date unknown.

* cited by examiner

ROLL TARP SYSTEM

RELATED APPLICATION

This application is a U.S. Non-Provisional patent application which claims priority to U.S. Provisional Patent Application Ser. No. 61/613,986, filed on Mar. 22, 2012 and titled "Roll Tarp System," which is hereby incorporated by reference in its entirety.

FIELD OF THE INVENTION

The invention is generally applicable to a roll tarp system. More specifically, the invention is applicable to a roll tarp system for covering an open top container, such as an open top container of a vehicle

BACKGROUND OF INVENTION

Open top containers are often used to transport materials, such as fungible goods, by water, rail or road. Open top containers are conventionally covered after loading to protect the container's contents. Such containers may also be covered when empty after unloading for a variety of reasons. During transport and storage, the contents of such open top containers are subject to weather damage and loss from wind.

Open top containers are often used to haul materials such as waste materials, soil, gravel, harvested product, e.g., oats, corn, barley, and wheat, between two or more locations, e.g., fields, silos, processing plants, etc. Typically, such open top containers are loaded from the top which requires a large portion of the top of a trailer to be open for loading. After loading, manually covering the container is time consuming, expensive, and potentially difficult. For example, the installation of a manual tarp over an open top container may take up to 30 minutes. Also, the operator may be required to climb to the top of a container in order to properly attach the tarp and cover the load, which may be inconvenient or difficult.

Several types of tarp systems have been developed to cover open top containers. Cable-pulley systems pull the tarp along a cable system running lengthwise at the top of the container. With such systems, it may take a long time to cover or uncover the container taking into account the typically long length of such containers. Also, with such systems, a cable-pulley often stores the tarp at the front of the container when open, which reduces the open area for loading. Further, the function of such systems can be impeded by large heaped, i.e., fully or over loaded, loads when covering or uncovering the container, which requires more operational time and can increase the difficulty of covering the container.

Another type of conventionally employed tarp system is a flip tarp system, which includes arms on both sides of the container. Such systems generally include arms which pivot about the midpoint of the container body and deploy a tarp over the top of the container as the arms are moved in a forward to rear direction, relative to the container. Such systems typically require a large amount of clearance over the top of the container to keep the tarp from striking any object or obstruction in the path of the arms and tarp.

Another conventional type of tarping system is a side flip tarp system that has arms on at least the front and back of the trailer that pivot at one side of the top the trailer and include a mechanism that moves one or both arms to flip the tarp from a closed position horizontal to the ground to a vertical position alongside the trailer (i.e., parallel to the sidewall of the container). There are also conventional side flip systems where the tarp is split longitudinally into two sections that each have an arms in the front and back of the trailer that pivot at each side of the top of the trailer and include a mechanism to move each section of tarp from a closed position horizontal to the ground to a vertical position along each side of the trailer. These systems have proven very difficult to completely seal the contents of the trailer inside the trailer. Some such systems require a heavy torque tube to run the entire length of the trailer in order to cause the back arms to flip the tarp, making the system heavy, thus reducing payload.

In addition, side rolling tarp systems have been used. A typical side roll tarping system generally includes a roll pipe connected to a tarp. The roll pipe turns in one direction, and travels across the container from one side to the other, as it rolls up the tarp to expose the open container below. To cover the open container, the roll ripe turns in the opposite direction and travels back across the container, thus unrolling the tarp over the open container.

Several disadvantages exist with such conventional side roll systems. Some such systems employ a spring biasing member to apply a load to a pivoting arm for use in rolling and unrolling the tarp. Such systems can be expensive and require a great deal of torque from biasing means, such as for example, large springs, to apply an adequate amount of tension to the tarp. Large mounting brackets are then required to house and store the energy from these biasing members. Further, such systems often employ the use of an arm disposed in the back of a container, which can hamper the operation of a rear door. Additional rolling tarp systems may use a cable or other tensioning device to bring the tarp back over the load. However, such systems using a cable to bring the tarp back over the load may be prone to damage from various loading processes, such as for example, damage from front loaders. Furthermore, when a side roll system is mechanically driven, failure of an actuator can cause the need for manual operation of the system or cause the side roll system to be inoperable until repaired. Furthermore, if a manual bypass is provided for the manual operation of the roll system in the case of a mechanical failure, an operator is often required to climb up near the drive mechanism of the unit to uncouple the actuator. Next, the operator must climb up again to connect the manual crank and lock it in place to work properly, which may be inconvenient or difficult.

BRIEF DESCRIPTION OF THE DRAWINGS

The accompanying drawings incorporated herein and forming a part of the specification, illustrate several embodiments of the present invention and together with the description serve to explain certain principles of the invention.

DETAILED DESCRIPTION OF THE INVENTION

Figure 1:
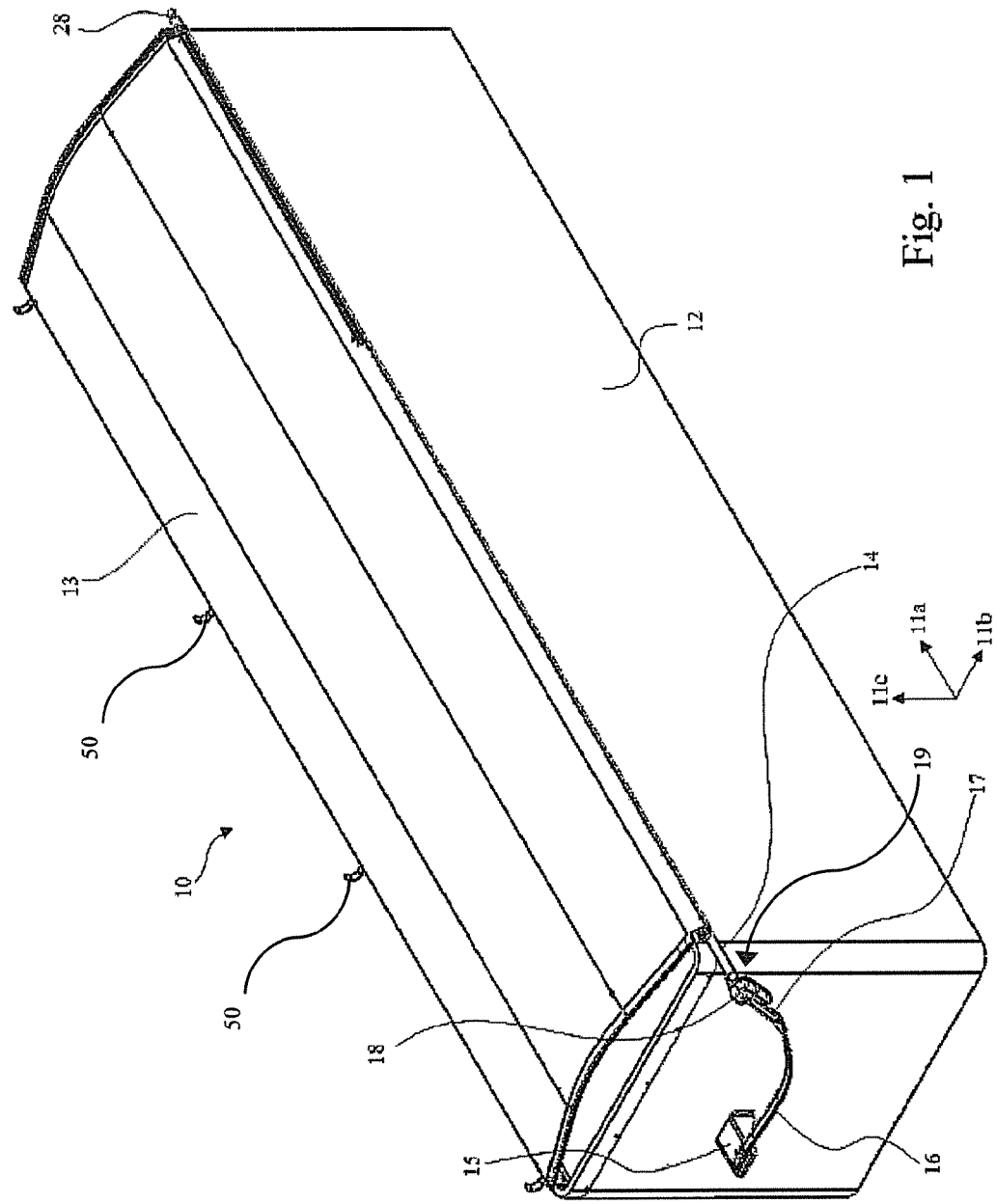
FIG. 1 is a perspective view of a container including one exemplary embodiment of a roll tarp system, showing an open top container with a roll pipe and a tarp in a third position, i.e., the roll pipe secured in a closed and locked position.

The present invention will now be described with occasional reference to specific embodiments of the invention. This invention may, however, be embodied in different forms and should not be construed as limited to the embodiments set forth herein. Rather, these embodiments are provided so that this disclosure will fully convey the scope of the invention to those skilled in the art and are not intended to limit the scope of the invention in any way. Indeed, the invention as described in the specification is broader than and not limited by the exemplary embodiments set forth herein, and the terms used herein have their full ordinary meaning.

Also, while the detailed exemplary embodiments described in the specification and illustrated in the drawings relate to tarp systems for use with the covering of open top containers of vehicles, it should be understood that the tarp system described herein may be used in connection with any type of container.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the invention, the singular forms "a," "an," and "the" are intended to include the plural forms as well, unless the context clearly indicates otherwise.

Unless otherwise indicated, all numbers expressing quantities of ingredients, measurements, properties such as molecular weight, reaction conditions, and so forth as used in the specification and claims are to be understood as being modified in all instances by the term "about." Accordingly, unless otherwise indicated, the numerical properties set forth in the specification and in any claims are approximations that may vary depending on the suitable properties sought to be obtained in embodiments of the present invention. Notwithstanding that the numerical ranges and parameters setting forth the broad scope of the general inventive concepts are approximations, the numerical values set forth in the specific examples are reported as precisely as possible. Any numerical values, however, inherently contain certain errors necessarily resulting from error found in their respective measurements.

The terms "connecting" and "securing" "coupling" "attached," and "mounting" as used herein, include but are not limited to affixing, joining, attaching, fixing, fastening, or placing in contact two or more components, elements, assemblies, portions or parts. Connecting, securing, coupling, attaching, and mounting two or more components, etc., can be direct or indirect such as through the use of one or more intermediary components and may be intermittent or continuous. The term tarp as used herein includes any flexible sheet member, whether it be made of a solid or mesh type material. A roll pipe can be of any crossection and is not necessarily round.

The present application describes various exemplary methods and apparatus for a roll tarp system. In an exemplary embodiment, a container assembly is provided which includes a container, a roll pipe, a tarp sized to cover an open top of the container, a power mechanism for rolling the roll pipe from a closed position in which the tarp covers the open top to an open position in which the open top is exposed, and an arm assembly having a flexible arm portion. The arm assembly biases the roll pipe toward the closed position when the roll pipe is in the open position.

In another exemplary embodiment, a roll tarp system includes a container, a roll pipe, a tarp sized to cover an open top of the container, a power mechanism for rolling the roll pipe from a closed position in which the tarp covers the open top to an open position in which the open top is exposed, and an aim assembly having a flexible arm portion and a rigid arm portion. The roll pipe of the exemplary embodiment is disengagable from the power mechanism by operator manipulation of a release mechanism.

In another exemplary embodiment, a roll tarp system includes a container, a roll pipe, a tarp sized to cover an open top of the container, a power mechanism for rolling the roll pipe from a closed position to an open position, and an arm assembly having a flexible portion. The roll pipe of the exemplary embodiment may be disengagable from the power mechanism and movable by an operator by use of a manually operable device.

In another exemplary embodiment, a roll tarp system includes a container, a roll pipe, a tarp sized to cover an open top of the container, a power mechanism for rolling the roll pipe from a closed position to an open position, and an arm assembly having a flexible aim portion and a rigid arm portion. The roll pipe of the exemplary embodiment may be disengagable from the power mechanism and movable by an operator by use of a manually operable device.

In another exemplary embodiment, a roll tarp system includes a container, a roll pipe, a tarp sized to cover an open top of the container, a power mechanism for rolling the roll pipe from a closed position to an open position, and an arm assembly having a flexible arm portion. The flexible arm portion of the exemplary embodiment includes a plurality of arm sections or leaves.

In another exemplary embodiment, a roll tarp system includes a container, a roll pipe, a tarp sized to cover an open top of the container, a power mechanism for rolling the roll pipe from a closed position to an open position, and an arm assembly having a flexible arm portion and a rigid arm portion. The flexible arm portion of the exemplary embodiment includes a plurality of arm sections or leaves.

In another exemplary embodiment, a roll tarp system includes a container, a roll pipe, a tarp sized to cover an open top of the container, a power mechanism for rolling the roll pipe from a closed position to an open position, and an arm assembly having a flexible arm portion. The exemplary embodiment of roll tarp system further includes a roll return system operably connected to the roll pipe for assisting the power mechanism in returning the tarp to an open position and/or contributing to the smooth operation of the tarp system when the tarp is moved from the open position to the closed position and/or from the closed position to the open position. In the exemplary embodiment of the roll tarp system, the power mechanism is operably connected to one end of the roll pipe and the roll return system is operably connected to the opposite end of the roll pipe.

In another exemplary embodiment, a roll tarp system includes a container, a roll pipe, a tarp sized to cover an open top of the container, a power mechanism for rolling the roll pipe from a closed position to an open position, and at least a pair of arm assemblies, each arm assembly having a flexible arm portion. In various such embodiments, each of the arm assemblies may include a power mechanism. In various additional embodiments, some of the arm assemblies may be provided without a power mechanism.

In another exemplary embodiment, a roll tarp system includes a container, a roll pipe, a tarp sized to cover an open top of the container, a power mechanism for rolling the roll pipe from a closed position to an open position, and an arm assembly having a flexible arm portion and a rigid arm portion. The flexible arm portion of the exemplary embodiment includes a plurality of arm sections or leaves.

In another exemplary embodiment, a roll tarp system includes a container, a roll pipe, a tarp sized to cover an open top of the container, a power mechanism for rolling the roll pipe from a closed position to an open position, and an arm assembly having a flexible arm. The power mechanism is attached to one end of the arm and the other end of the arm is attached to the container. The roll pipe of the exemplary embodiment is disengagable from the power mechanism and moveable by an operator by use of a manually operable device.

Features and advantages of the invention will be set forth in part in the description which follows, and in part will be obvious from the description, or may be learned by practice of the invention. The accompanying drawings, which are incorporated in and constitute a part of this specification, illustrate several embodiments of the invention, and together with the description, serve to explain the principles of the invention.

This invention is directed to a roll tarp system for covering open top containers. The system rolls a tarp from one side of the container to the other in a reciprocating manner. In various exemplary embodiments, a biasing member is loaded (i.e., by the bending or torque applied to the biasing member) as the tarp is moved toward an open position during the uncovering of the container. During the covering of the container, as the tarp is let out, the biasing member biases the roll tarp system toward a closed position. The two motions provide a covered position and an uncovered position. Various exemplary embodiments of the present invention are discussed with regard to a container having longitudinal, lateral, and transverse directions. One of ordinary skill in the art will appreciate that the roll tarp system of the present invention may be configured to cover any type, shape or size container.

Referring now to the drawings, FIG. 1 illustrates an exemplary embodiment of roll tarp system 10. For discussion only, the exemplary embodiment of roll tarp system illustrated in FIGS. 1-4 is oriented with regard to longitudinal 11a, lateral 11b, and transverse 11c directions positioned to be essentially orthogonal. In general, the longitudinal direction 11a is aligned with the longest portion of the open top container 12, the lateral direction 11b extends from one side of the container to the other, and the transverse direction 11c is aligned with a vertical plane. All directions are with respect to an open top container 12. The illustrated directions 11a, 11b, 11c are for discussion only and do not limit in any way the practice or application of the invention.

As discussed, the exemplary roll tarp system 10 may be used to cover an open top container 12. The illustrated exemplary embodiment of the roll tarp system 10 generally includes a tarp 13, a roll pipe 14, and a latching mechanism, such as a latch plate 43. The tarp 13 is used to cover the container 12 when the container is loaded with material, or when coverage of the container is otherwise desired. A first side of the tarp 13 is attached to a first side of the open top container 12 (as illustrated in FIG. 1). The opposing second side of the tarp 13 is attached to a roll pipe 14. In practice of the invention, the roll pipe can be oriented on the opposing side of the container in the covered position. Further, in various embodiments of the roll tarp system, one or more tarps can be used to cover some or all of the open top container. In embodiments that include more than one tarp for covering the container, each tarp may be coupled to a separate roll tarp system, thus providing for the independent operation of each tarp.

The roll tarp system 10 relies at least in part on an arm assembly to control the position of the roll pipe. The aim assembly of the roll tarp system 10 helps to eliminate the need for a number of pivots and the large biasing means typically required by a side roll system. As shown in FIGS. 1-4, an aim mount 15 is attached to an end of the container 12, either at the front end of the container, the back end of the container, or both, and a flexible arm segment 16 is attached to the arm mount 15. In the illustrated exemplary embodiment, flexible arm segment 16 is connected to a rigid arm segment 17 such that the two arms segments 16, 17 may move in relation to each other. The flexible arm segment 16 may be connected to the rigid arm segment 17 in a variety of ways. For example, as illustrated in FIGS. 16-19, in various embodiments of the roll tarp system 10, the flexible arm segment 16 may be connected to the rigid arm segment 17 by a pivot member 110 that pivotally connects the flexible arm segment 16 to the rigid arm segment 17. However, it should be understood that such a pivot member 110 is not provided with all embodiments of the roll tarp system 10 and in some embodiments the flexible arm segment 16 is connected directly to the rigid arm segment 17. In various additional embodiments, the arm assembly may include a flexible arm only and not include a rigid arm segment.

In the illustrated exemplary embodiment of the roll tarp system 10, the flexible arm segment 16 biases the roll tarp system towards a closed position. However, it should be understood that in additional embodiments of the roll tarp system 10, one or more arms may be provided that bias the roll tarp system towards an open position. In yet additional embodiments, the roll tarp system 10 may include one or more arms that bias the roll tarp system towards a closed position.

In the exemplary embodiment of the roll tarp system 10 illustrated in FIGS. 1-4, an actuator 18 is attached to the rigid arm segment 17. The actuator 18 may be attached to the rigid arm segment 17 in a variety of different ways. In the exemplary illustrated embodiment, the actuator 18 is attached to the roll pipe 14 by use of a coupling unit 19. In the illustrated embodiment of the roll tarp system 10, the actuator is an electric motor including an optional gear reducer attached. However, in various additional embodiments, the actuator 18 may be any powered device or mechanism.

Figure 2:
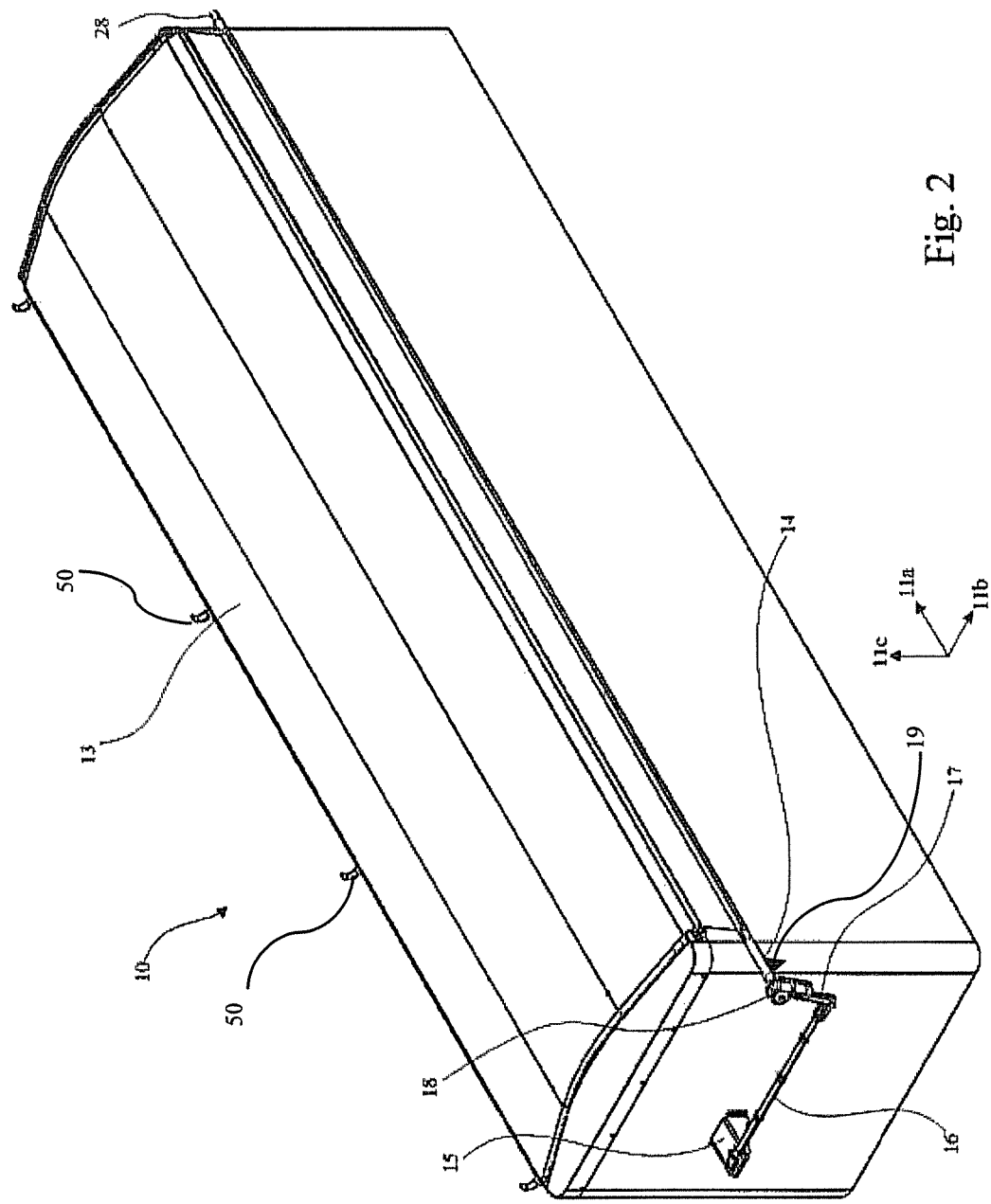
FIG. 2 is a perspective view of the container and embodiment of roll tarp system illustrated in FIG. 1, showing the roll pipe and tarp in a second position, i.e., the tarp in a fully extended position which covers a portion of the side of the container.
Figure 3:
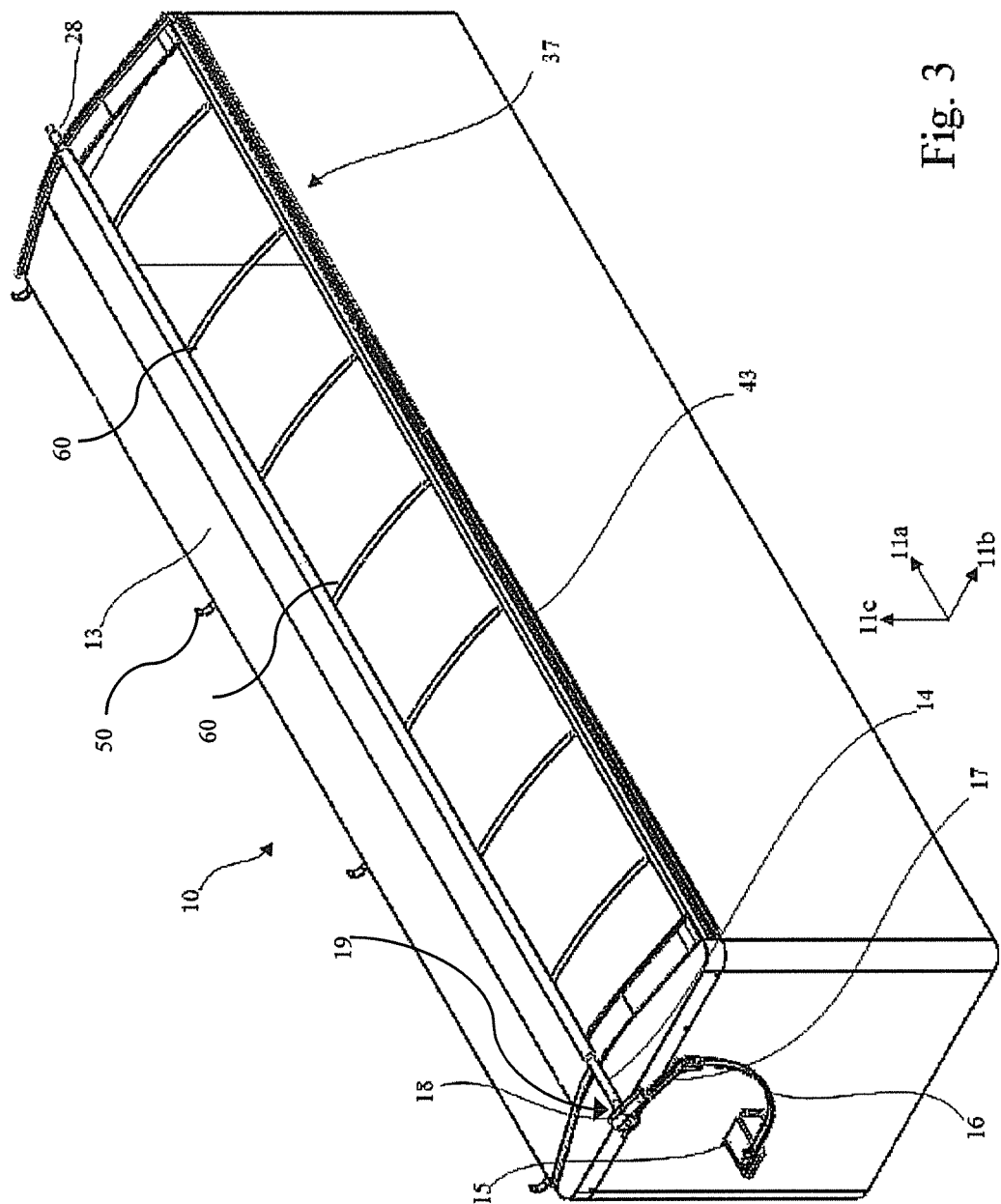
FIG. 3 is a perspective view of the container and embodiment of roll tarp system illustrated in FIG. 1, showing with the roll pipe and tarp in a partially opened position.
Figure 4:
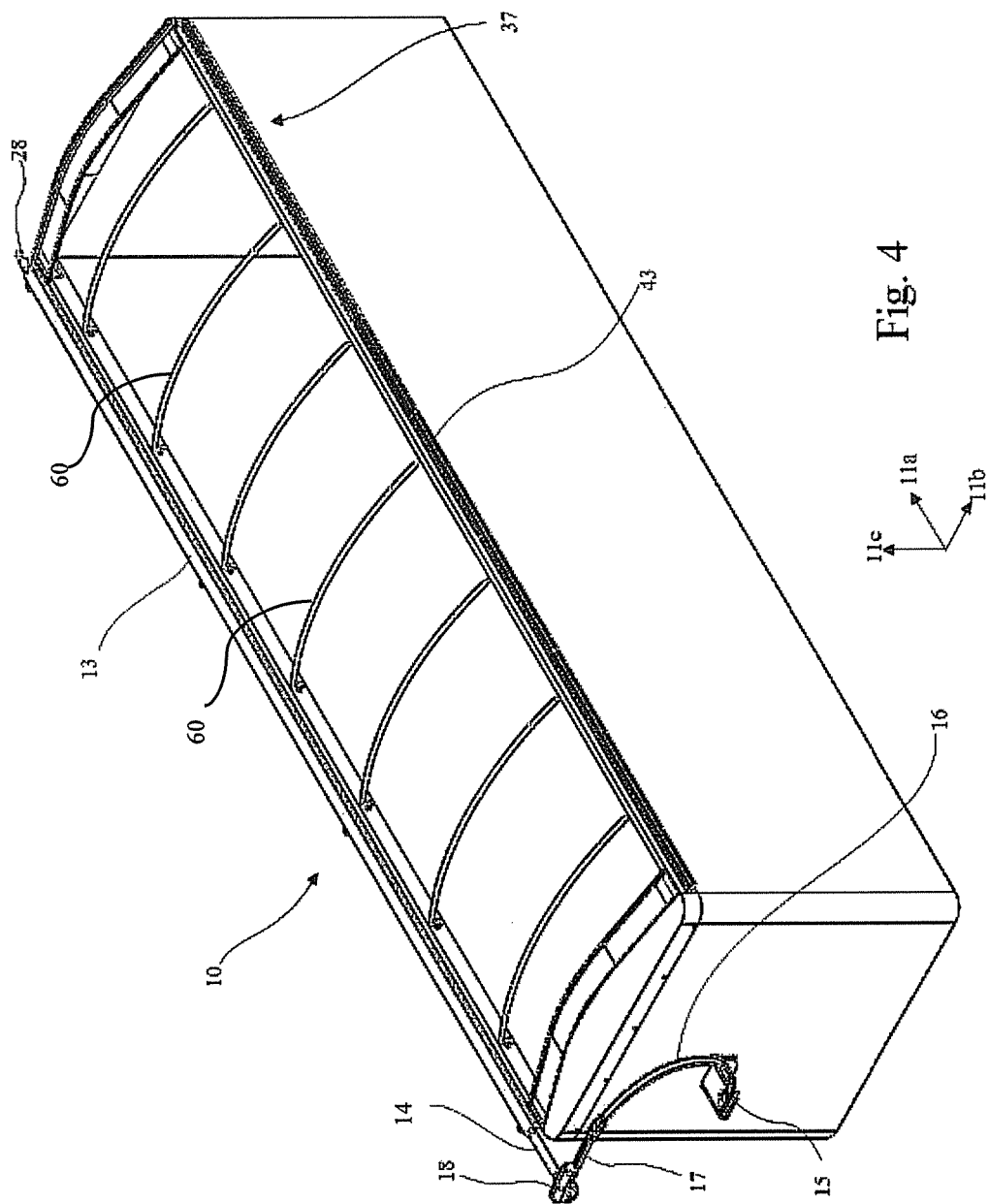
FIG. 4 is a perspective view of the container and embodiment of roll tarp system illustrated in FIG. 1, shown with the roll pipe and tarp in a first position, i.e., the roll pipe in an open position.

An exemplary travel path of the roll pipe and tarp are shown in FIGS. 1-4. FIG. 1 illustrates the container 12 with the tarp 13 and roll pipe 14 in a covered position with the roll pipe 14 engaged with the latching mechanism 43 in a locked position (i.e., the third position). In FIG. 2, the roll pipe 14 is shown in a fully extended position (i.e., the second position) before it advances back up the side of the container 12 to a locked or latched position in engagement with the latching mechanism 43. FIG. 3 illustrates a container 12 with the roll pipe 14 disposed between the two sides of the container 12 in a partially open position with the interior of the container 12 partially exposed. FIG. 4 shows the container 12 with the tarp 13 rolled up and the roll pipe 14 at the far side of the container 12 in a fully open position (i.e., the first position). As discussed in further detail herein, the arm assembly biases the roll pipe 14 towards the closed position and helps to urge the roll pipe 14 to the closed position when it is desired that the container 12 be covered. As shown in FIGS. 1-3, the illustrated exemplary embodiment of the roll tarp system 10 includes a plurality of supports 50 for supporting the roll pipe 14 and tarp 13 when the roll tarp system 10 is in the open position (i.e., first position). Such supports can have a variety of sizes, shapes and configurations in various embodiments of the roll tarp system.

During the covering of the roll tarp system 10, the actuator 18 is activated to rotate the roll pipe 14 to unroll the tarp 13. In the illustrated embodiment of the roll tarp system 10, the roll pipe is rotated in a clockwise direction (when viewed from the front of the container with the arm mount 15) during the covering operation. The roll pipe 14 moves from the first position shown in FIG. 4 (i.e. the fully open position) and travels over the top of the container 12 with the tarp 13 being unrolled as the roll pipe 14 moves to cover the open top container 12. The flexible arm segment 16, which biases the roll tarp system 10 of the illustrated embodiment towards the closed position, serves to urge the actuator 18 and roll pipe 14 along towards the closed position during the unrolling of the tarp over the container (as shown in FIG. 3). The flexible arm segment 16 also resists the torque of the actuator 18 that turns the roll pipe 14.

Figure 14:
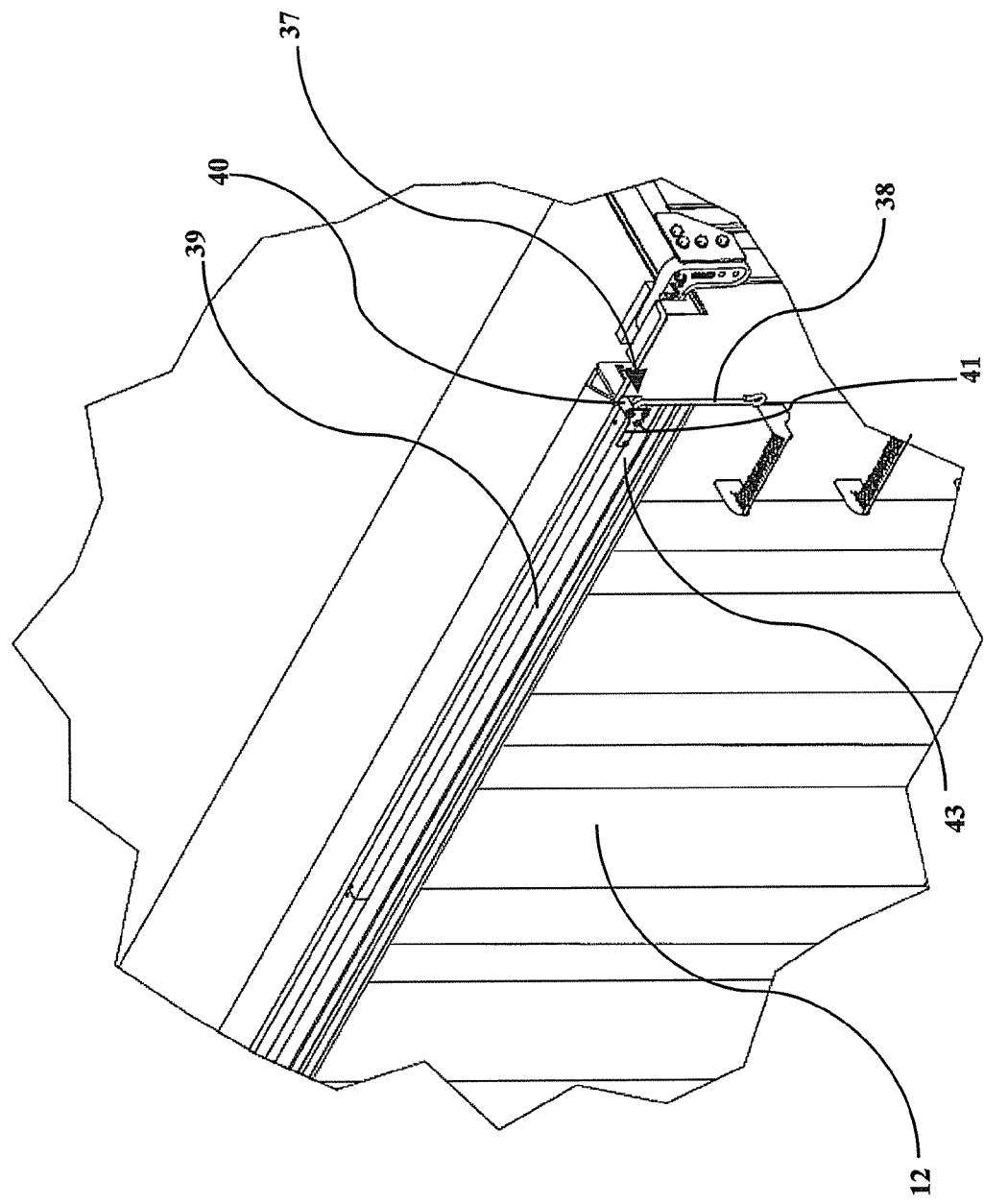
FIG. 14 is a magnified perspective view of the section designated as "A" in FIG. 13 showing the latching mechanism and roll return system.
Figure 15:
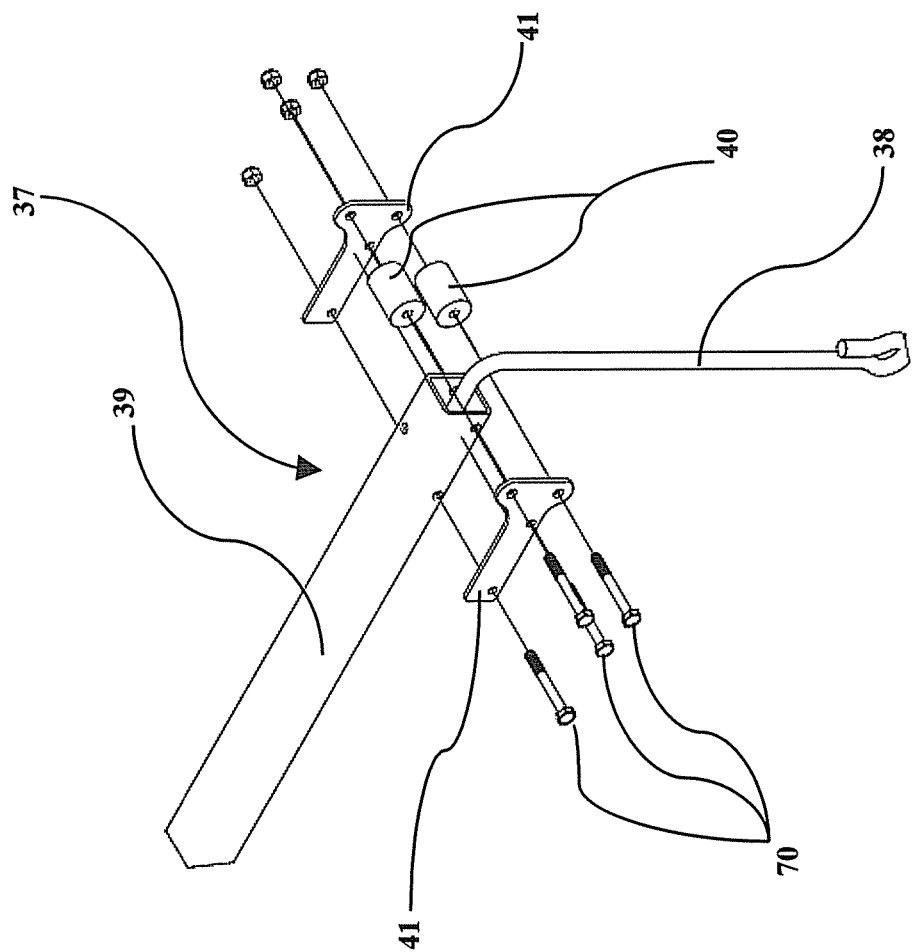
FIG. 15 is an exploded perspective view of the roll return system of the embodiment of roll tarp system illustrated in FIG. 1.

Once the roll pipe 14 reaches the other side of the container 12 and the container is fully covered by the tarp 13, the roll pipe 14 travels downward along the side of the container 12 until the tarp 13 is completely unrolled from the roll pipe 14 (i.e., the second position) as shown in FIG. 2. As the roll pipe 14 continues to rotate after the tarp 13 is completely unrolled from the roll pipe 14 in response to the operation of the actuator 18, the tarp 13 begins to be rolled back up onto the roll pipe (as a result of the tarp 13 being affixed to the roll pipe 14). The rolling up of the tarp 13 back onto the roll pipe 14 due to the continued rotation of the roll pipe 14, causes the roll pipe 13 to travel back upwards along the sidewall of the container 12 until it contacts the latching mechanism 43 (which is best illustrated in FIG. 14). As the roll pipe 14 is pressed securely against the latching mechanism 43 (i.e., the third position) as shown in FIG. 1, the tarp is stretched tightly over the container. The actuator 18 is then deactivated and locks in the position where it was deactivated. The roll tarp system 10 remains in the closed and latched position until an opening operation of the roll tarp system is initiated. The deactivation of the actuator 18 can be triggered automatically in response to a sensor or could be deactivated in response to the commands of an operator.

Figure 13:
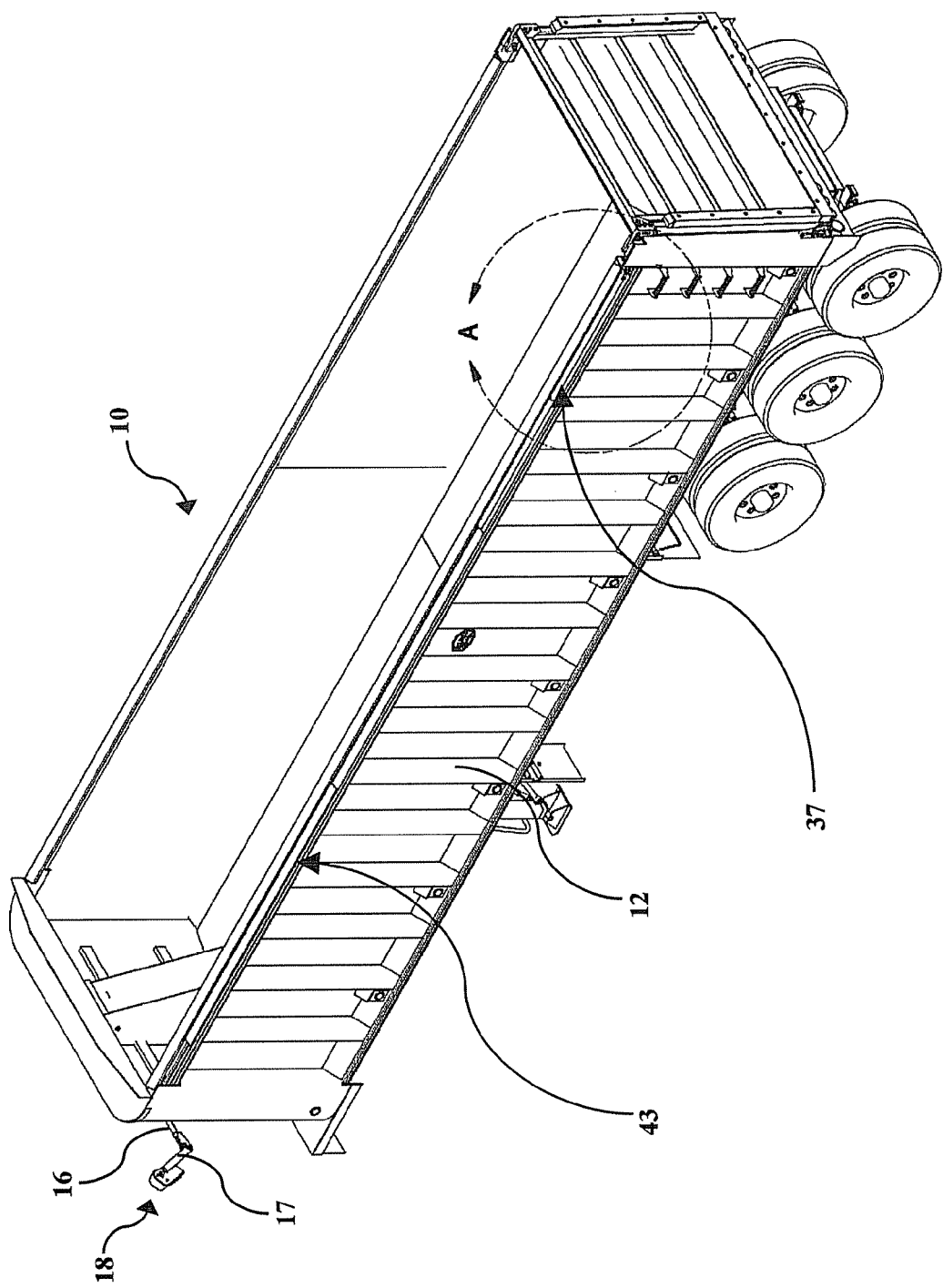
FIG. 13 is a rear perspective view of the container and embodiment of roll tarp system illustrated in FIG. 1 with the roll bar and tarp removed to illustrate the latching mechanism and roll return system.

The latching mechanism 43 of the illustrated embodiment helps to secure the roll tarp system 10 in the closed position over the open top container 12 and prevent the tarp from becoming opened when not desired. In this manner, a vehicle connected to the open top container 12 can be driven and/or the open top container 12 can be otherwise transported, moved, etc., without the roll tarp system 10 becoming opened. The latching mechanism 43 can have a variety of size, shapes an configurations in various embodiments of the roll tarp system. In the illustrated embodiment of the roll tarp system 10, the latching mechanism 43 is a plate that extends outwardly from a sidewall of the open top container 12. However, in additional embodiments, the latching mechanism 43 may be constructed differently For example the latching mechanism may be comprised of one or more tabs or projections that extend from the open top container 12. The latching plate 43 may extend along generally the entire length of the open top container 12 (as shown in FIG. 13) or only extend along a portion of the length of the container 12. In various embodiments, the latching plate 43 may have a curved profile that corresponds to the general shape of the roll pipe 14 to ensure a secure engagement of the roll pipe 14 with the latching plate 43. However, in various additional embodiments, the latching plate 43 may have a variety of different shapes.

To open the roll tarp system 10 of the illustrated embodiment, the steps described above in connection with the covering of the container 12 are reversed. To open the container, the actuator 18 is activated to rotate the roll pipe 14 in the opposite direction as during the covering of the container (i.e., counter-clockwise direction (when viewed from the front of the container with the arm mount 15). The small portion of the tarp 13 that was rolled up on the roll pipe 14 during the locking of the roll pipe 14 under the latching member 43 is first unrolled from the roll pipe as a result of the activation of the actuator 18. This causes the roll pipe 14 to travel downward along the sidewall of the container and out from under the latching mechanism 43. Once this portion of the tarp 13 has been unrolled from the roll pipe 14, the tarp then begins be rolled up onto the roll pipe 14 due to the affixation of the tarp 13 to the roll pipe 14 and the continued rotation of the roll pipe 14 in response to the operation of the actuator 18.

As the tarp 13 is rolled up onto the roll pipe 14, the tarp is now between the roll pipe 14 and the latching plate 43 allowing the roll pipe 14 to roll over the latching plate 43. As the tarp continues to be rolled up on the roll pipe 14, the roll pipe 14 is drawn back over the top of the container 12 towards the open position due to the shortening of the tarp 13 from being rolled onto the roll pipe 14. When the roll pipe reaches the open position (i.e., the first position) it is supported on the supports 50 proximate the lateral 11b edge of the container as illustrated in FIG. 4. The actuator 18 is deactivated and locks in position, holding the rolled up tarp in position alongside the top of the container. During the uncovering of the container 12 and the movement of the roll pipe 14 back to the open position, the biasing force of the flexible arm 16 is restored due to the bending of the arm during the movement of the roll pipe to the open position. As a result, the flexible arm will then be in a position to bias the roll tarp system 10 towards the closed position once a closing operation of the roll tarp system 10 is commenced.

As shown in FIGS. 3-4, the exemplary illustrated embodiment of the roll tarp system includes cross-members or bows 60 that support the tarp 13 as it is unrolled over the top of the open top container 12. The bows 60 also help to ensure that the tarp does not contact the material loaded in the container and provide the closed tarp with a curved or dome shaped profile to prevent rain from collecting or pooling on top of the closed tarp, but rather to run off the sides of the container 12. However, it should be understood that additional embodiments of the roll tarp system 10 are provided without such bows 60.

Many powered roll tarp systems experience failure during the life of the system, often because of motor or some other electrical failure. Consequently, any system which does not provide for manual operation of the roll tarp system will be inoperable until repairs can be performed. The actuator 18 (with motor with optional gear reduction) locks the rotation of the roll pipe 14, therefore in the event of a motor or electrical failure, the roll pipe 14 cannot turn. Various exemplary embodiments of the present invention are configured to allow for the disconnecting of the roll pipe 14 from the actuator 18 to allow for safe and efficient manual operation by the operator until a time when repairs can be performed. It should be understood, however, that all of the roll tarp systems of the present invention need not include such a disconnect feature.

Figure 5:
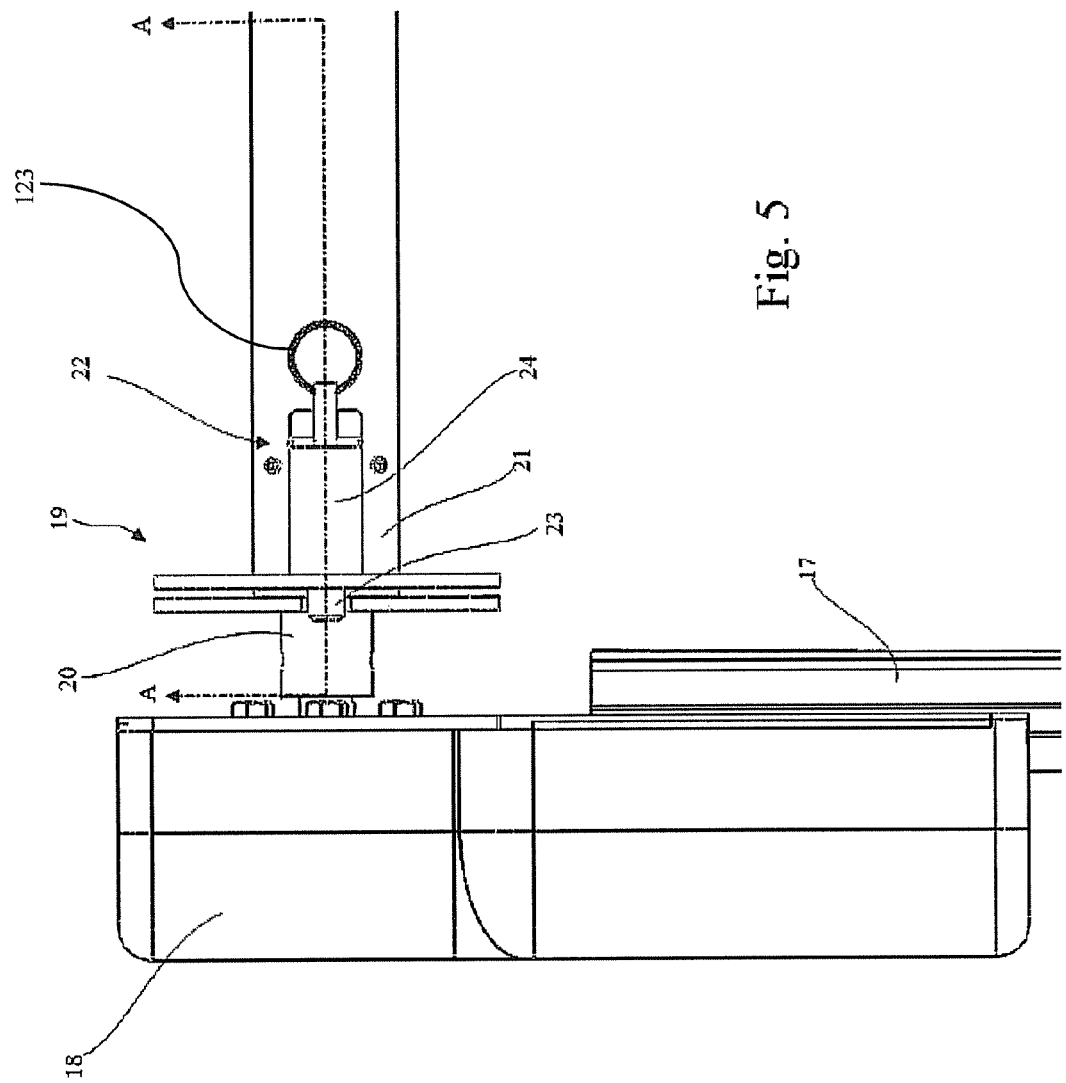
FIG. 5 is a side view of the actuator and coupling unit of the of the embodiment of roll tarp system illustrated in FIG. 1.
Figure 6:
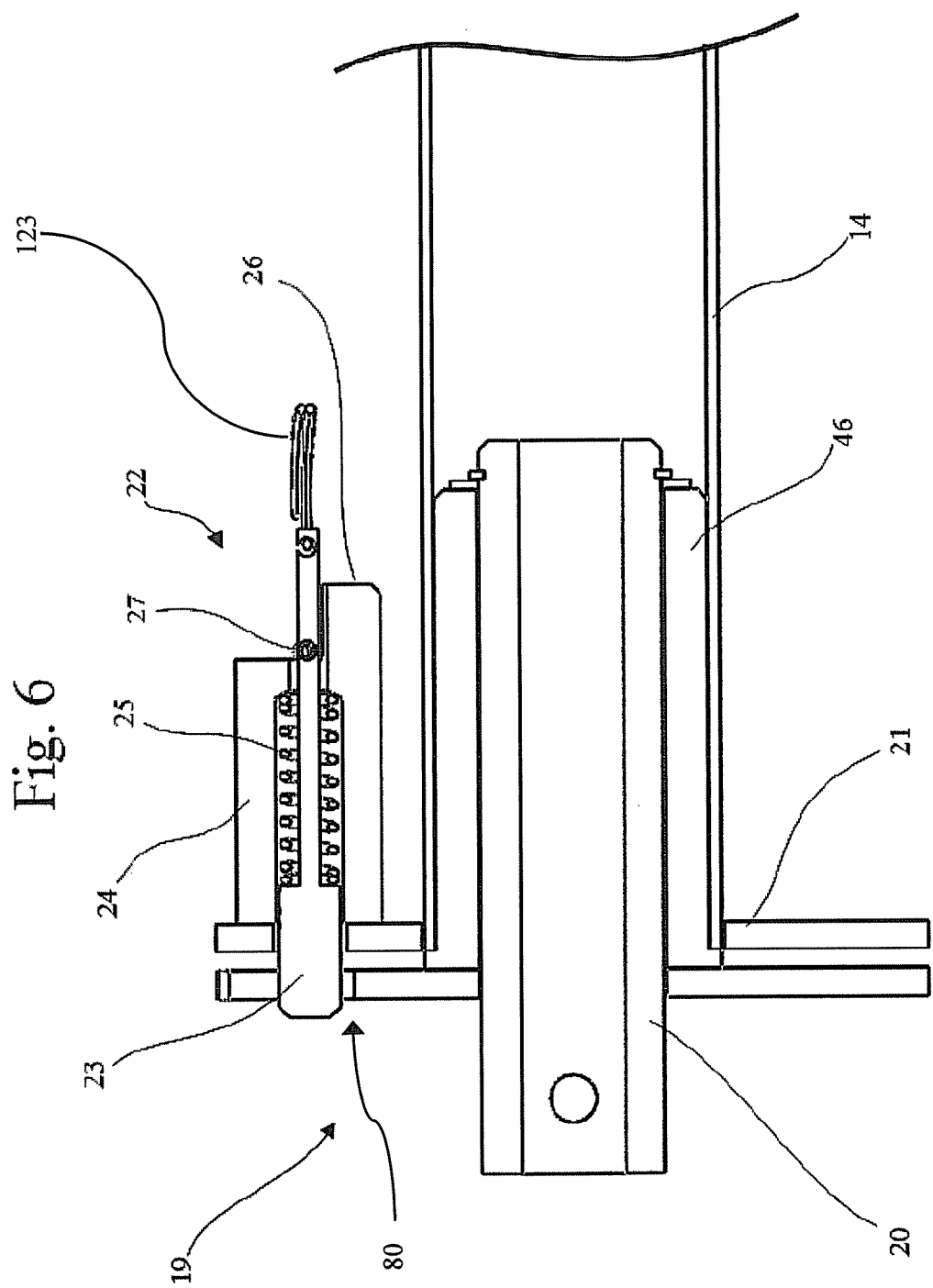
FIG. 6 is a sectional view of the coupling unit shown along the lines A-A of FIG. 5, showing a coupler unit pin engaged.
Figure 7:
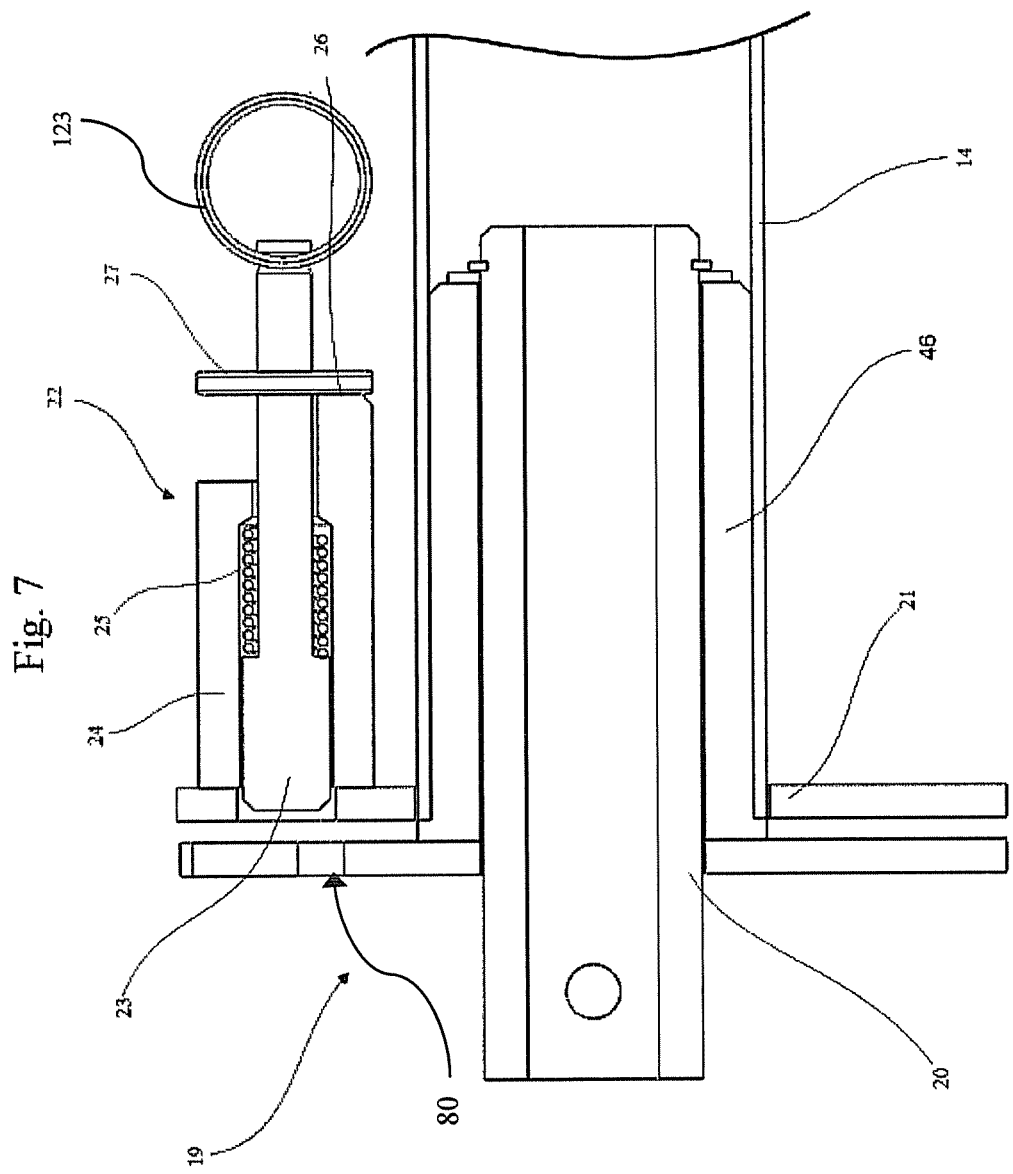
FIG. 7 is a sectional view of the coupling unit of FIG. 5 shown along the lines A-A of FIG. 5, showing a coupler unit pin disengaged.

Referring now to FIGS. 5-7, a top view of the roll pipe 14 and the rigid arm segment 17 of the aim assembly of an exemplary embodiment is shown. As is shown in FIGS. 5-7, the coupling unit 19 of the exemplary embodiment includes an actuator attachment 20. The actuator attachment 20 is connected to torque transfer unit 21 by a quick disconnect unit 22. The quick disconnect unit 22 includes a first pin 23, a pin housing 24, and spring 25. The first pin 23 mounts in the pin housing 24. The spring 25 serves to bias the pin 23 into opening 80 defined within the actuator attachment to engage the torque transfer unit 21 with the actuator attachment 20 and prevent rotation of the torque transfer unit 21 relative to the actuator attachment 20. However, one of ordinary skill in the art should appreciate that the torque transfer unit 21 and torque transfer unit 21 may be coupled in a variety of suitable ways in additional embodiments. An operator can manipulate the pin 23 from ground level to disengage the pin 23 from the actuator attachment 20 to facilitate the disconnecting of the roll pipe 14. In various embodiments of the roll tarp system 10, a tool may be provided for manipulation of the pin 23 from ground level or another position located at a distance from the pin 23.

FIG. 6 is a sectional view of the coupling unit 19 showing additional detail of the coupling unit 19 when the pin 23 is engaged with the actuator attachment 20. FIG. 7 shows the first pin 23 after it has been disengaged from the actuator attachment 20 by compressing the spring 25. The spring can be compressed by any suitable method, such as for example, by pulling of ring 123. In the illustrated embodiment of the roll tarp system 10, the first pin 23 is held in this disengaged position by a stop 26 and a second pin 27 that projects from the first pin 23. Upon being disengaged from the actuator attachment 20, the pin 23 of the illustrated embodiment can be rotated once pin 27 has been pulled back past stop 26. The rotation of the pin 23 causes pin 27 to abut with stop 26 and prevent the pin 23 from forward movement until the pin is rotated again to disengage pin 27 from stop 26. However, it should be understood that pin 23 can be secured in a disengaged position in a variety of suitable ways in additional embodiments.

Figure 9:
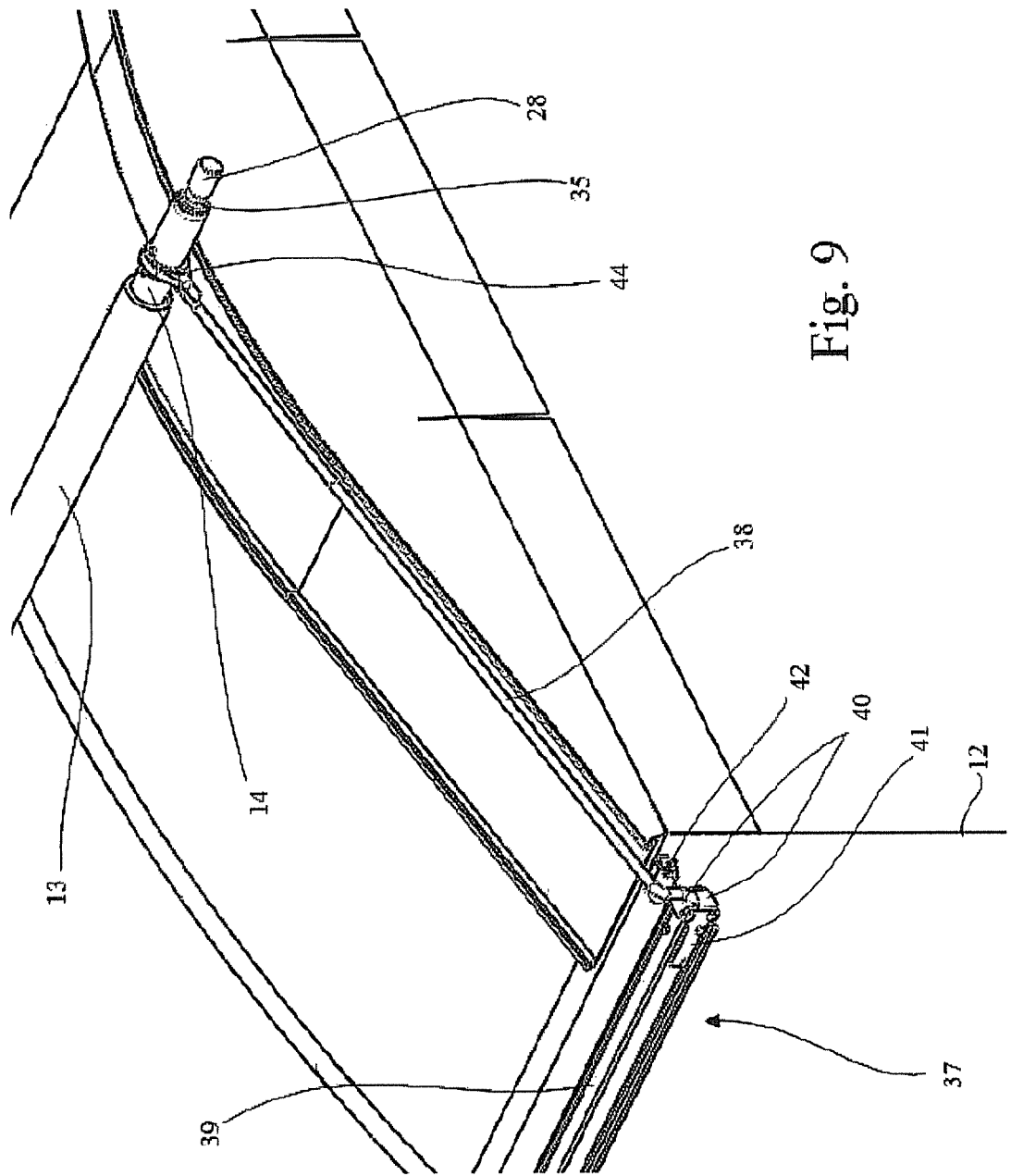
FIG. 9 is a perspective view of a rear portion of the container and embodiment of roll tarp system illustrated in FIG. 1, shown with the roll pipe and tarp in a partially open position.
Figure 10:
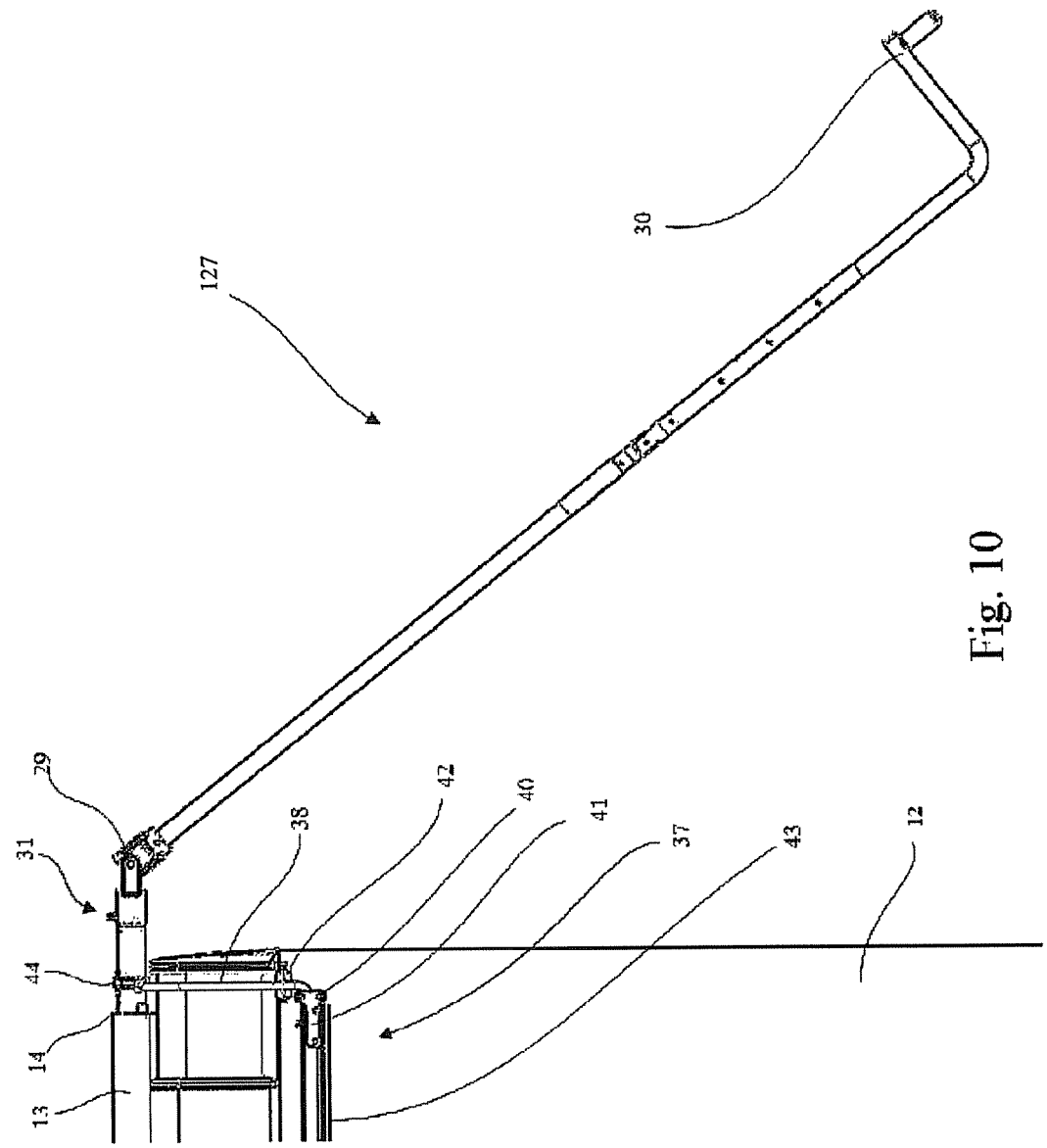
FIG. 10 is a side view of a portion of the container and embodiment of roll tarp system illustrated in FIG. 1, shown with an optional manual crank attached to the roll pipe.

While the pin 23 is in the disengaged position, the actuator attachment 20 can spin freely within bearing 46, which allows for manual operation of the roll tarp system 10 by a user, such as for example, by using a manual crank 127 illustrated in FIG. 10. The roll pipe of the illustrated embodiment includes a coupler 28 located at an end of the roll pipe 14 (see FIGS. 8 and 9). The manual crank 127 of various exemplary embodiments is adapted to be coupled to coupler 28 and be operable by an operator standing at ground level to manually rotate the roll pipe 14. However, one of ordinary skill in the art should appreciate that the any suitable manual device may be used to manually operate the system 10. Once it is desired, for example, after manual operation to move the roll pipe 14 to a desired location or after the repair of the roll tarp system 10, the torque transfer unit 21 may be allowed to reengage with the actuator attachment 20 by rotating pin 23 and moving the second pin 27 off of the stop 26. In various exemplary embodiment, this may occur automatically. For example, in various embodiments, as the actuator 18 rotates the actuator attachment 20, the spring loaded pin 23 may automatically project back through opening 80 defined in the actuator attachment 20, torsionally locking the actuator attachment 20 to the torque transfer unit 21.

During routine operation of roll tarp system 10, movement of the roll pipe 14 is controlled in part by a torque transfer unit 21 that transfers the torque of the actuator 18 to the roll pipe 14. The torque transfer unit 21 connects to one end of the roll pipe 14. In various exemplary embodiments, the second end of the roll pipe 14 may include a rear coupler 28 and a roll return system 37. In various embodiments, the roll return system 37 may be located at the front or the rear of the container 12 or both. In the illustrated embodiment, the roll return system is located at the rear of the container.

Figure 8:
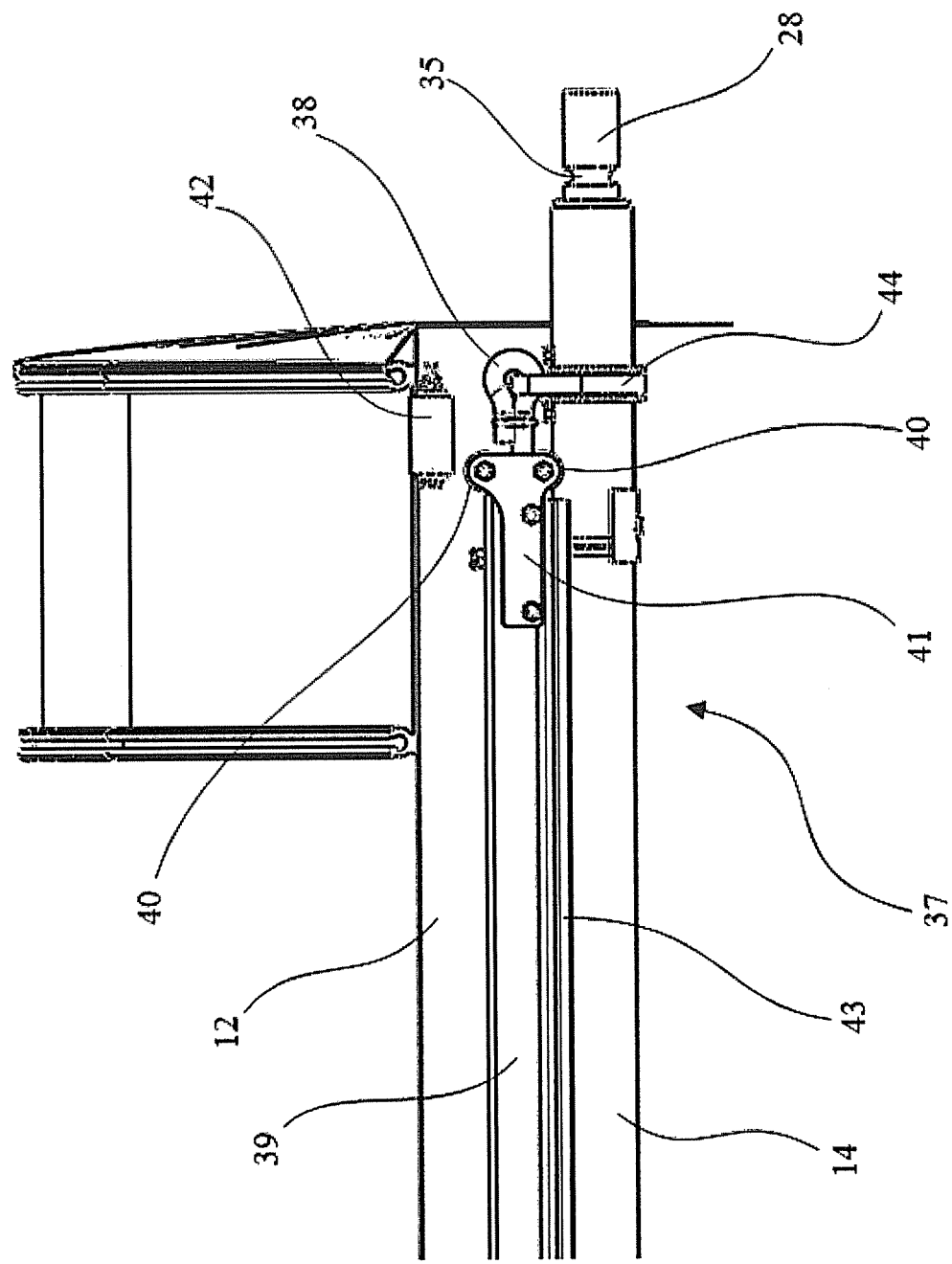
FIG. 8 is a side view of a portion of the embodiment of roll tarp system illustrated in FIG. 1, shown with the roll pipe in the third position (i.e., the roll pipe secured in a closed and locked position) and the tarp removed.

As seen in FIGS. 8, 9, 14 and 15, the illustrated embodiment of the rear return system 37 includes an elastic cord 38, a cord housing 39, a cable attachment 44. One end of the elastic cord 38 mounts inside a cord housing 39. The cord 38 may be mounted to the cord housing 39 in a variety of different ways in various embodiments. In the illustrated embodiment, cord 38 is an elastic cord, however, in additional embodiments the cord may be comprised of any elongate member, such as rope, twine, a chain, cable, etc. In various embodiments, the cord 38 may be combined with an extensible member. FIG. 8 is a side view of the back end of container 12 with the roll pipe 14 in the third position and no tarp shown. The cord housing 39 shown in FIG. 8 mounts longitudinally along the body in the illustrated embodiment. However, it should be apparent to one skilled in the art that the cord housing 39 can be mounted in different configurations and in different locations relative to the container 12 in additional embodiments. The other end of the elastic cord 38 connects to a cable attachment 44 located on the roll tube 14 that is free to rotate relative to the roll tube 14. The cable attachment 44 allows the rear coupler 28 to remain free from resistance against rotation being exerted upon the roll tube 14 by the attachment of the cable 38 to the roll tube 14. A variety of alternative suitable mechanisms may be used for coupling the cable 38 to the roll tube 14 in additional embodiments.

The rear roll return system 37 has rollers 40 for smooth release and return of the elastic cord 38. Additional embodiments of the roll tarp system 10 may be provided without any such rollers 40. The rollers 40 are supported in mounting plates 41. In the illustrated embodiment, the mounting plates 41 are attached to the cord housing 39 by fasteners 70, however, in various additional embodiments the mounting plates 14 may be mounted to the cord housing 39 in any suitable manner. Also, additional embodiments of the roll tarp system 10 may include mounting plates 41 that are integrally formed with the cord housing 39 or no mounting plates may be provided. An additional top roller 42 is mounted near the top of the open top container 12. The top roller 42 provides a smooth transition of the elastic cord 38 from the side wall to the top of the open top container 12 and helps to ensure that the cord 38 does not rub against the container and/or become frayed or damaged. Additional embodiments of the roll tarp system 10 may be provided without any such top roller 42. One skilled in the art will recognize that the placement or number of rollers 40 and top roller 42 will vary depending on the configuration of the rear roll return system 37.

Figure 11:
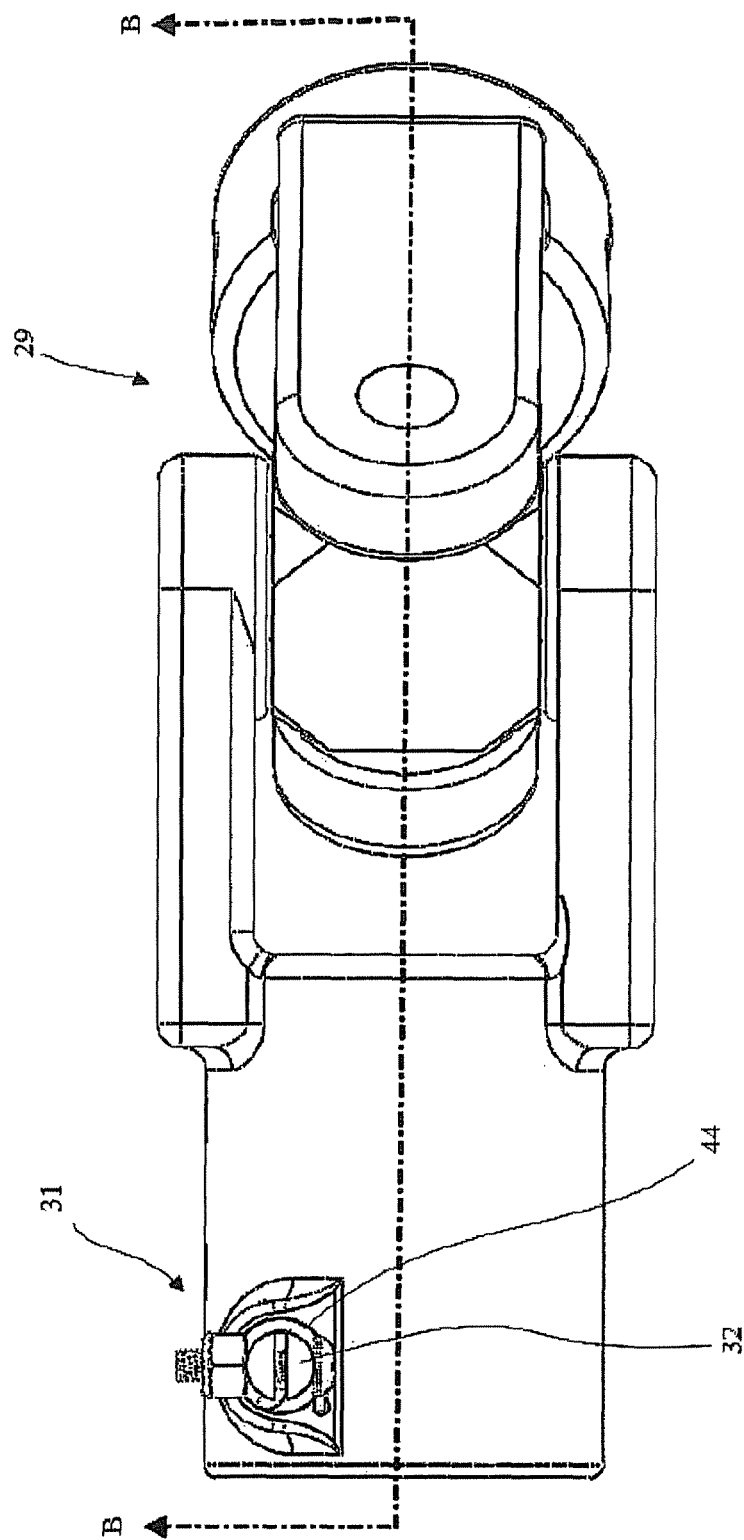
FIG. 11 is a top view of a joint of the optional manual crank of FIG. 10.
Figure 12:
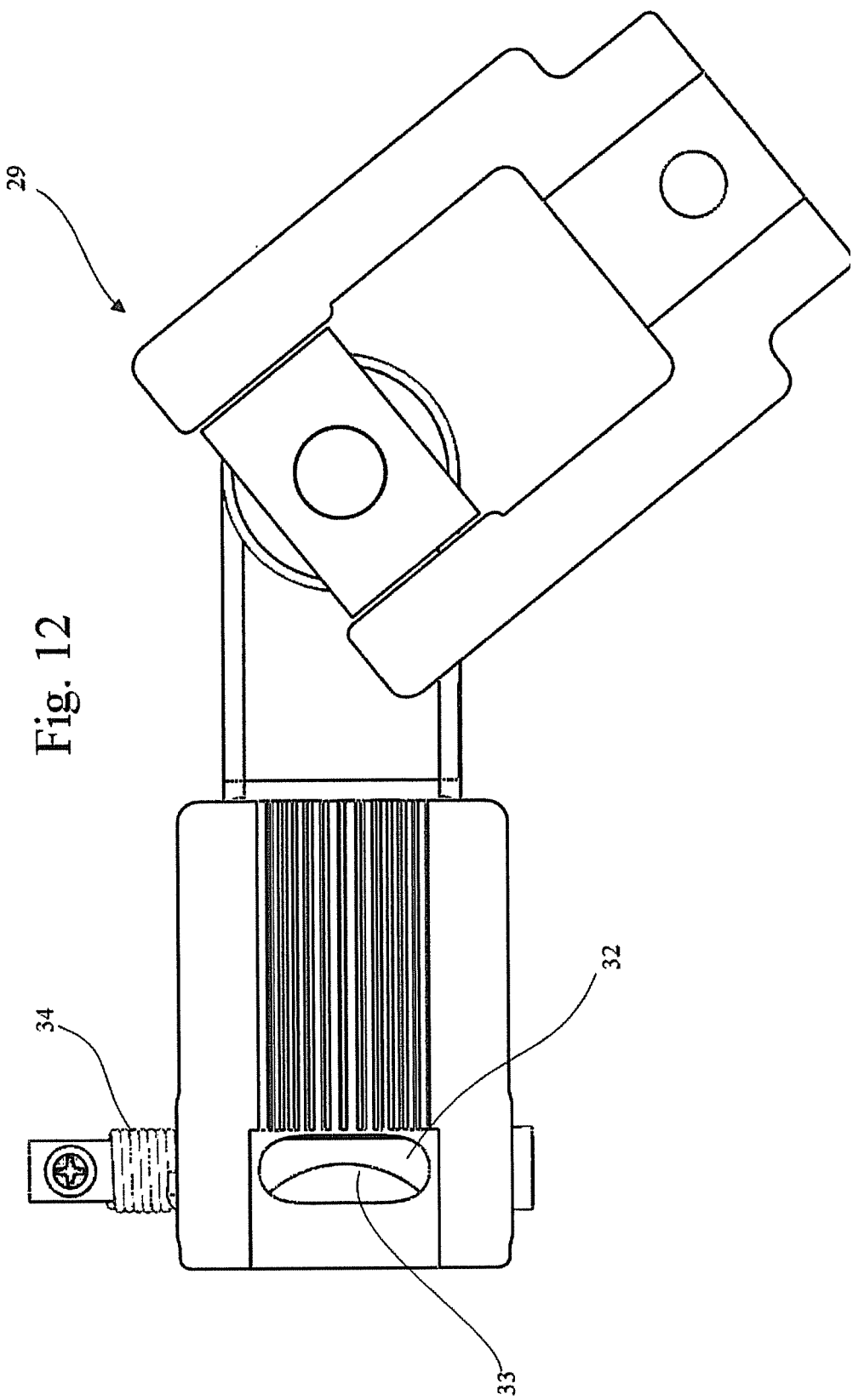
FIG. 12 is a sectional view of the joint of the optional manual crank of FIG. 10, shown along the lines B-B of FIG. 11.

As shown in FIGS. 10-12, the exemplary illustrated embodiment of the roll tarp system 10 includes a manual crank 127 connected to a joint 29 which can be turned by a handle 30 by an operator standing on the ground and generally without the need for any tools. In various exemplary embodiments, the joint 29 can be manually connected to the rear coupler 28 (e.g., while the operator is standing on the ground) and will automatically lock in place. The joint 29 of the manual crank may be connected to the rear coupler 28 in a variety of different ways in various embodiments. In the illustrated embodiment, the locking mechanism 31 includes a spring 34 biasing a twisting pin 32 to a neutral position. The twisting pin 32 has a notch 33. When the joint 29 slides over the rear coupler 28, the coupler 28 pushes on twisting pin 32 to turn twisting pin 32 out of the way. The notch 33 allows the rear coupler 28 to engage the joint 29 unimpeded. When the rear coupler 28 is fully engaged, the biasing spring 34 returns the twisting pin 32 to its neutral position and the pin 32 sits in a groove 35 on the rear coupler 28. With the twisting pin 32 resting in the groove 35, the twist pin 32 locks the manual crank 127 onto the roll pipe 14. However, one of ordinary skill in the art should appreciate that the manual crank 127 may be locked in place by any of a variety of suitable locking devices. With the manual crank 127 in place on the roll pipe 14 and pin 23 disengaged from the coupling unit 19, the crank can then be manually operated to turn the roll pipe 14 to cover and uncover a container 12. In various embodiments, when the roller is either all the way open (first position or all the way closed (third position), the manual crank can be stored along the side of the container 12. The universal joint 29 of the manual crank will then lock the roller in either of the two positions in such exemplary embodiments.

As discussed previously, the roll tarp system is configured to allow an operator to lock the roll pipe 14 and tarp 13 in a covered position. The illustrated embodiment of the roll tarp system 10 has a latch plate 43 (as shown in FIGS. 8, 10, 13 and 14). When the tarp 13 is fully extended, the roll pipe 14 extends down the sidewall of the container 12 past the latch plate 43 as seen in FIG. 2. When the roll pipe 14 rolls past the latch plate 43 it continues to roll reaching the end of the tarp 13. The roll pipe then rolls upward and back on the tarp 13 until the roll pipe 14 and tarp 13 latch under the latch plate 43.

Figure 16:
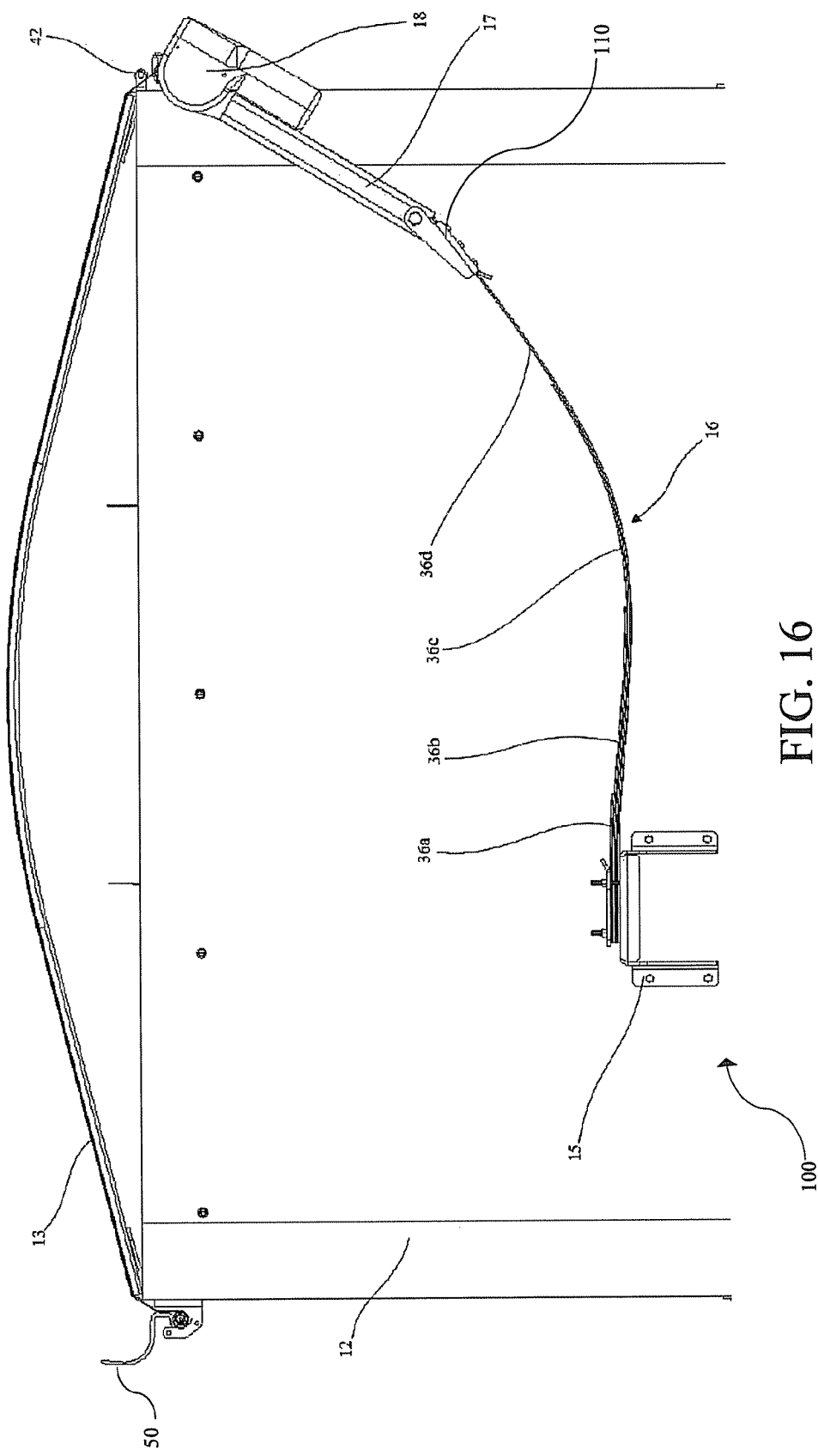
FIG. 16 is a front elevational view of a container including a second exemplary embodiment of a roll tarp system, showing an open top container with a roll pipe and a tarp in a third position, i.e., the roll pipe secured in a closed and locked position.
Figure 17:
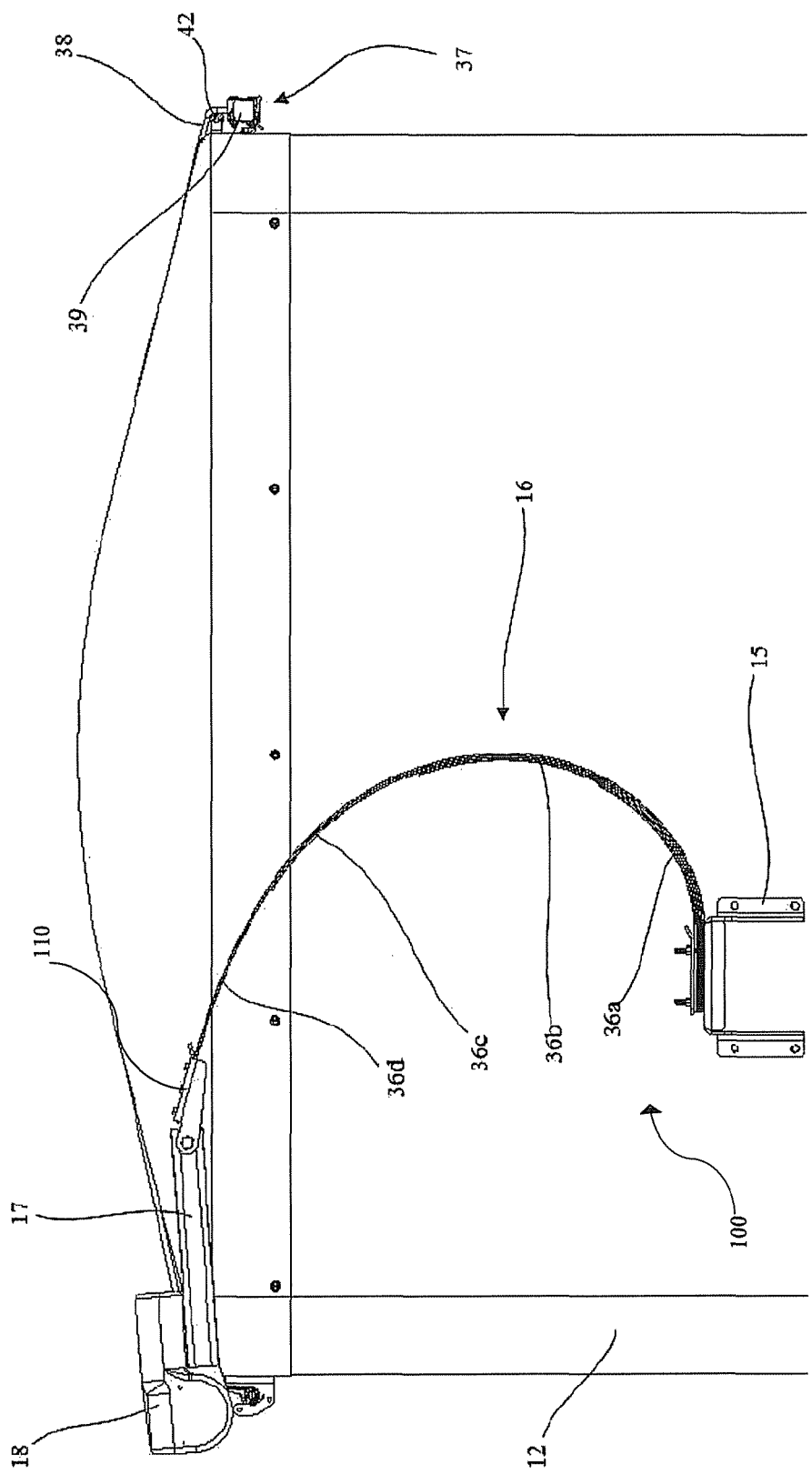
FIG. 17 is a front elevational view of the container and embodiment of roll tarp system illustrated in FIG. 16, shown with the roll pipe and tarp in a first position, i.e., the roll pipe in an open position.

Referring now to FIGS. 16-17, a second exemplary embodiment of roll tarp system 100 is shown. In the exemplary embodiment of roll tarp system 100, the flexible arm segment 16 includes four flexible leaves 36a, 36b, 36c, and 36d. Flexible arm segment 16 is attached to rigid arm segment 17 via pivot member 110 that pivotally connects the flexible arm segment 16 to the rigid arm segment 17. The placement and length of the flexible leaves 36a, 36b, 36c, 36d are adapted to provide adequate biasing force to the roll pipe 14 throughout its motion to keep the tarp properly tensioned and reduce the stress in the leaves for the given deflection. The leaves 36a, 36b, 36c, and 36d also provide a curve to the flexible arm 16 under load allowing the arm segments 16 and 17 to follow the motion of the roll pipe 14 during operation. The arm segment 16 also allows limited longitudinal movement of the roll pipe 14 without inducing large stresses in the arm assembly. In various embodiments, the flexible arm 16 can be made of a single leaf 36d or multiple flexible leaves 36a, 36b, 36c, and 36d, or any number of leaves. In the illustrated embodiment of the invention, the flexible leaves 36a, 36b, 36c, and 36d are made of fiberglass. However, it should be apparent to one with ordinary skill in the art that the flexible leaves 36a, 36b, 36c, and 36d and the flexible arm segments 16 of the various embodiments of roll tarp system disclosed herein can be made of any suitable elastic material (i.e. spring steel, carbon fiber, fiberglass, composite materials, etc.) which can be deformed without taking a permanent set.

Figure 18:
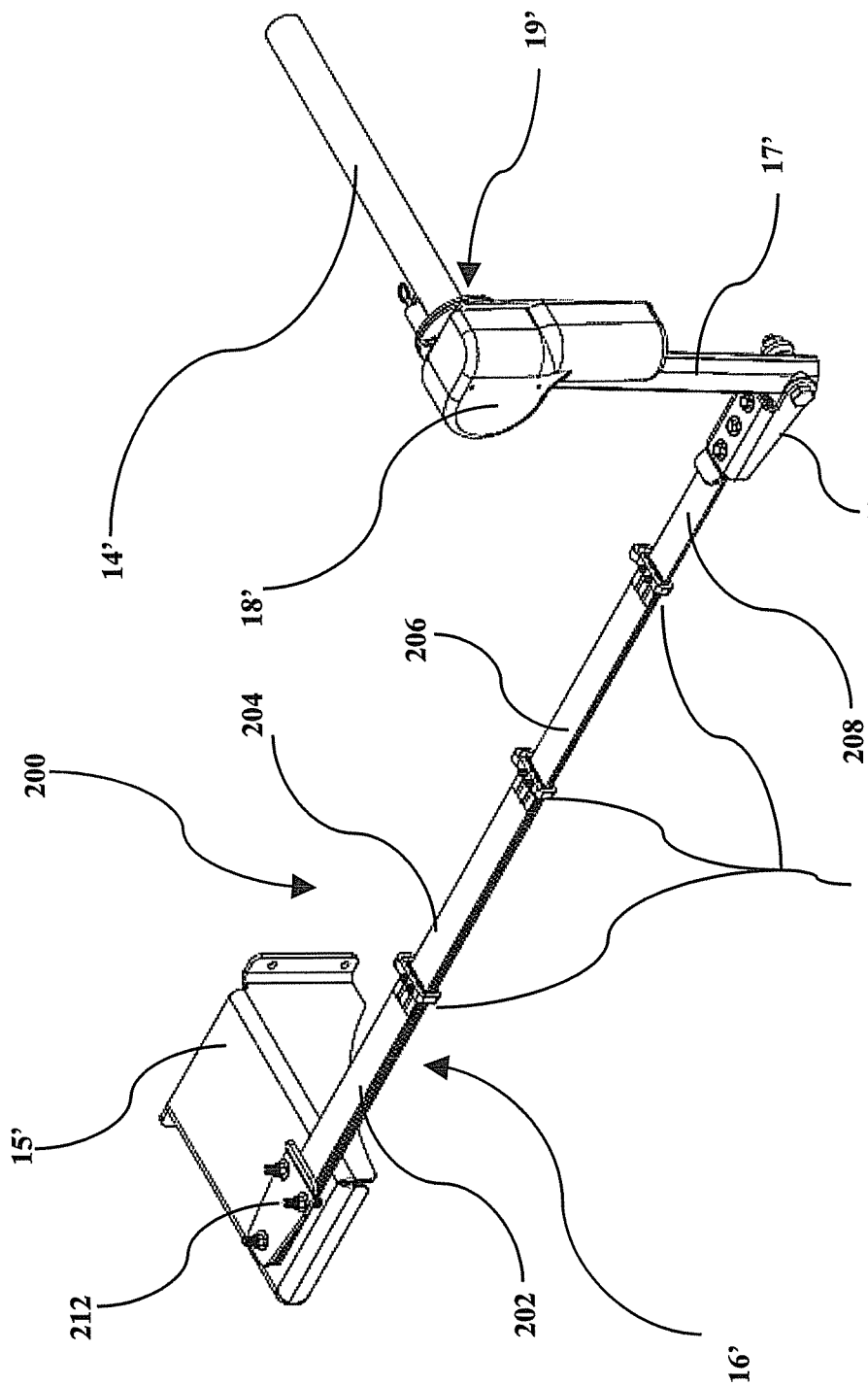
FIG. 18 is a perspective view of a of a portion of a third exemplary embodiment of a roll tarp system.
Figure 19:
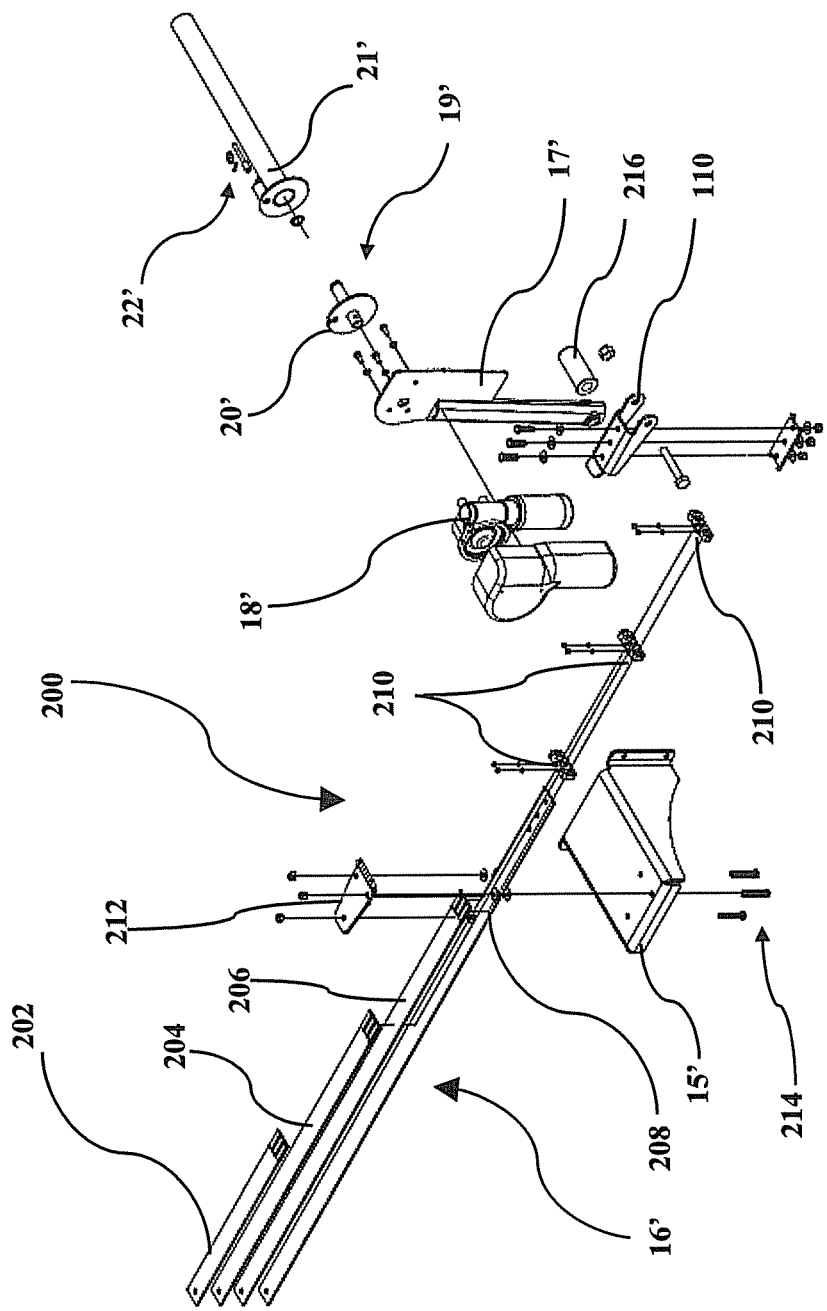
FIG. 19 is an exploded perspective view of a portion of the embodiment of roll tarp system illustrated in FIG. 18.

Referring now to FIGS. 18-19, a third exemplary embodiment of roll tarp system 200 is shown. The prime symbol is utilized in FIGS. 18-19 to indicate elements of roll tarp system 200 which may be similar but may not be identical to elements of roll tarp system 10. In the exemplary embodiment of roll tarp system 200, the flexible arm segment 16' includes four flexible leaves 202, 204, 206 and 208. As best illustrated in FIG. 19, flexible leaves 202, 204, 206 and 208 are assembled together by use of fasteners 210, although any suitable method may be used to attach flexible leaves 202, 204, 206 and 208 together in various additional embodiments. In the embodiment of roll tarp system 200 illustrated in FIGS. 18-19, fasteners 210 hold the flexible leaves 202, 204, 206 and 208 together, but allow them to slide longitudinally with respect to each other and the flexible arm segment 16' if bent. Flexible arm segment 16' is mounted to mount 15' via plate 212 and fasteners 214. However, in various embodiments of the roll tarp system described herein, the flexible arm segment 16 may be attached to the container mount 15 in a variety of ways. In various additional embodiments, the flexible arm segment 16 may be mounted directly to the container 12. Flexible arm segment 16' is attached to rigid arm segment 17' via pivot member 110 that pivotally connects the flexible arm segment 16' to the rigid arm segment 17'. In the illustrated embodiment of roll tarp system 200, pivot member 110 includes pivot joint 216 that allows rigid arm member 17 to pivot relative to the flexible arm member 16'.

Figure 20:
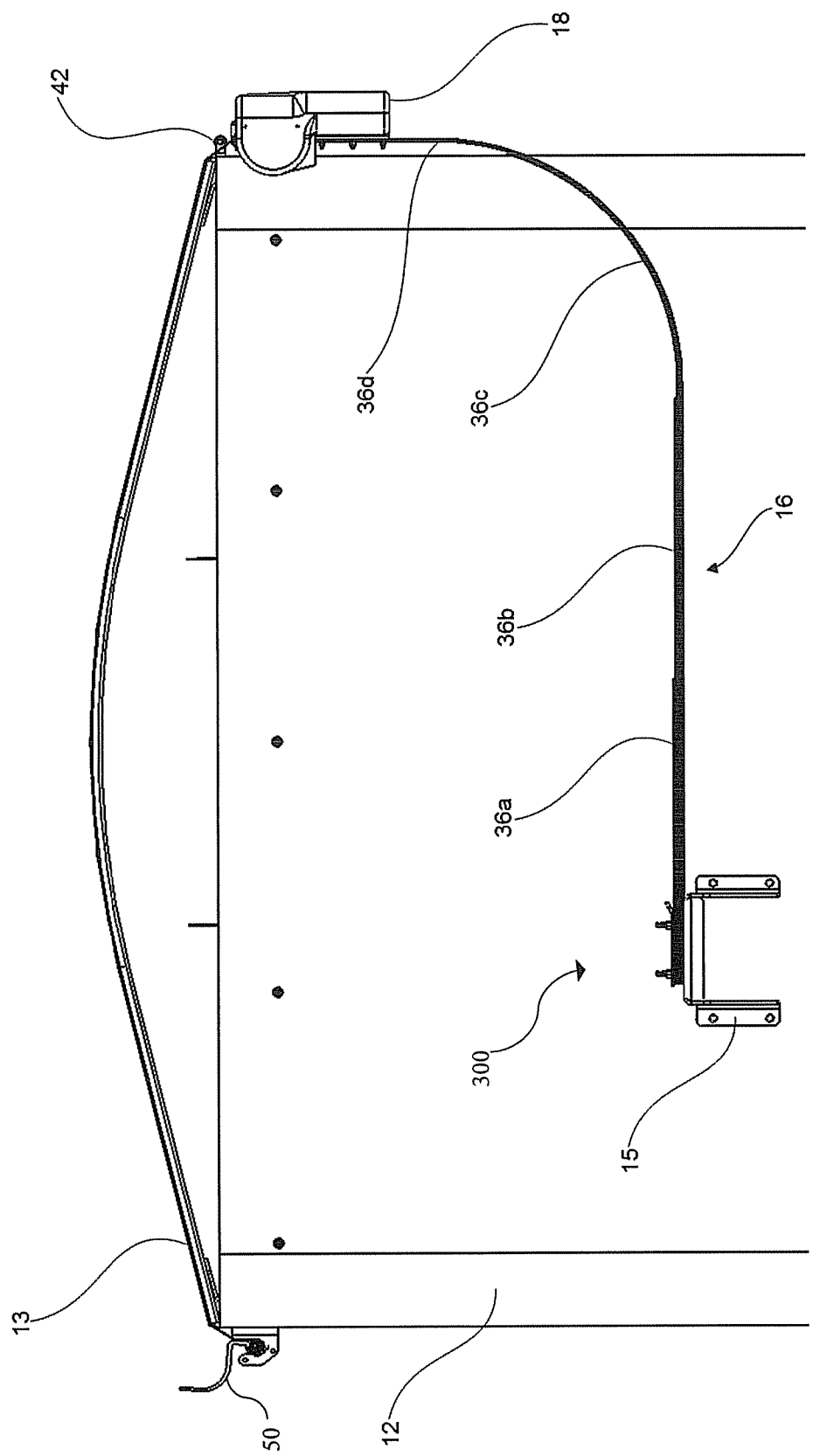
FIG. 20 is a front elevational view of a container including a fourth exemplary embodiment of a roll tarp system with the power mechanism fixedly mounted to the flexible arm assembly shown in the third position, i.e., the roll pipe secured in a closed and locked position.
Figure 21:
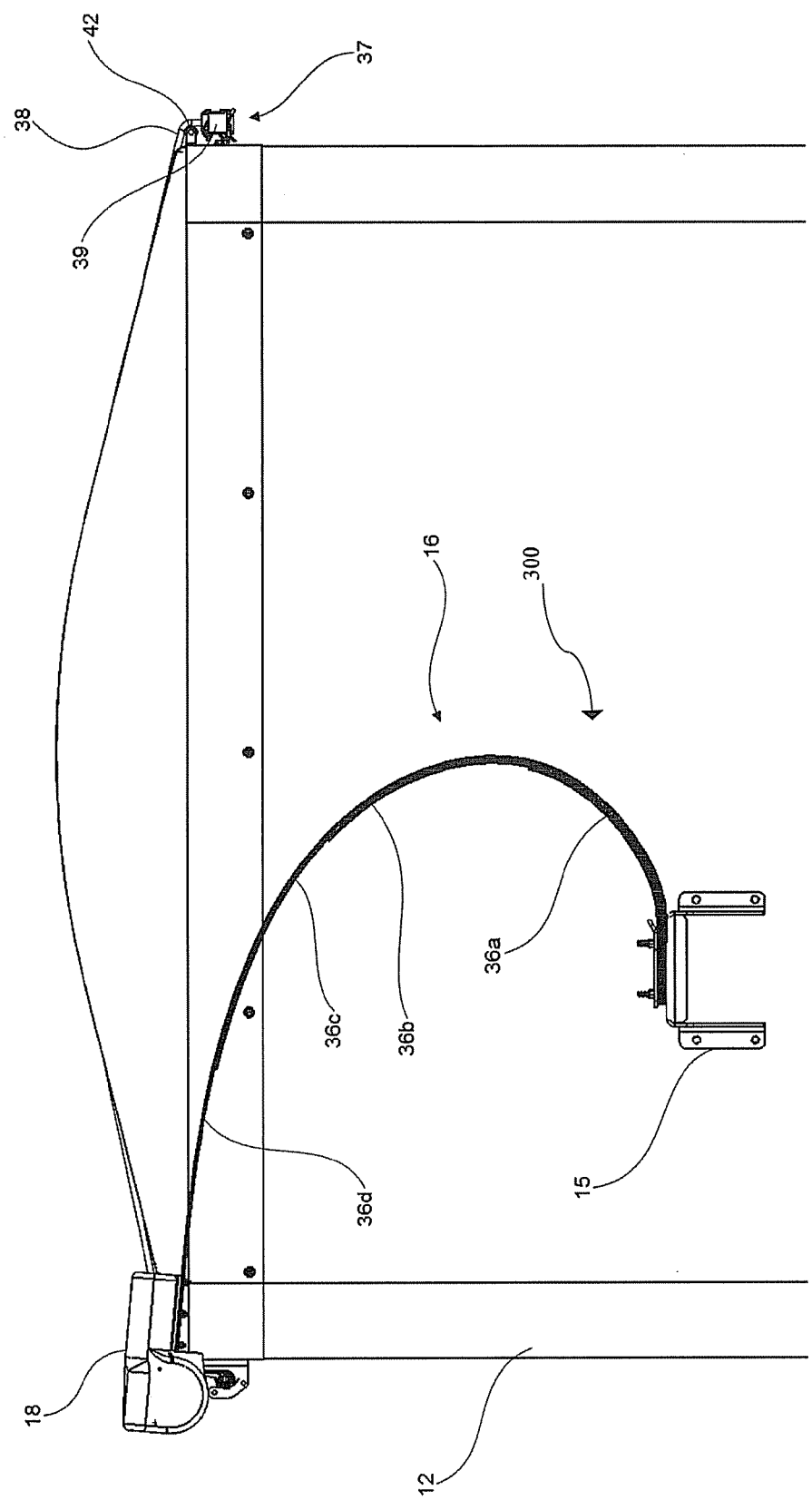
FIG. 21 is a front elevational view of the container and embodiment of roll tarp system illustrated in FIG. 20 shown in the first position, i.e., the roll pipe in an open position.

Referring now to FIGS. 20-21, a fourth exemplary embodiment of roll tarp system 300 is shown. In the exemplary embodiment of roll tarp system 300, the flexible arm segment 16 includes four flexible leaves 36a, 36b, 36c, and 36d and no rigid arm element is provided. Rather, the actuator 18 is mounted directly to flexible leave 36*d*. The actuator 18 may be mounted to the leave 36*d* or any of leaves 36*a*, 36*b*, 36*c*, and 36*d* in any suitable manner in various embodiments.

Figure 22:
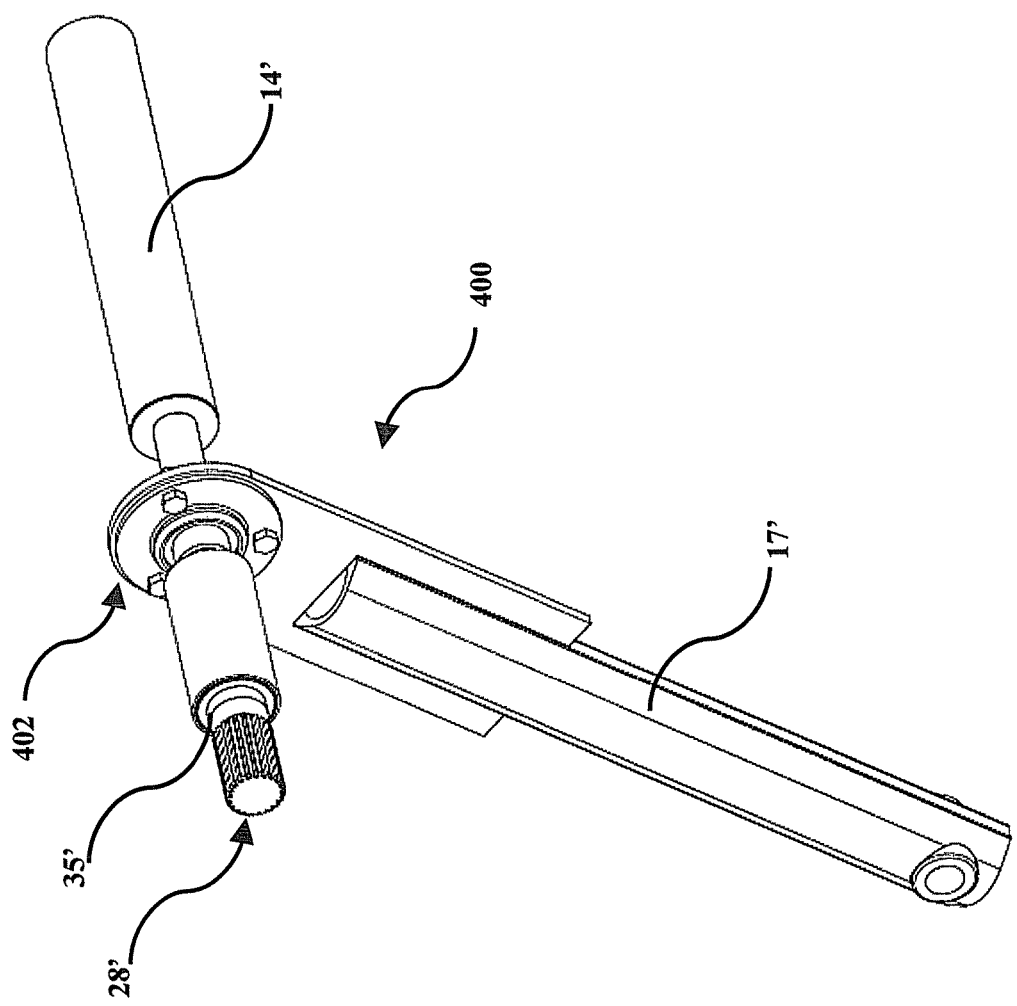
FIG. 22 is a perspective view of a portion of an optional rear aim of a fifth exemplary embodiment of a roll tarp system.

In additional exemplary embodiments of the roll tarp system 10, additional arm assemblies may be provided. For example an additional arm assembly may be mounted on the rear of the container 12 and rotatively connected to the rear end of the roll pipe 14 to help to further bias the rear end of the roll tarp system towards the closed position. In such embodiments, which include additional arm assemblies, the additional arm segments may be provided with or without an actuator 18 connected thereto. For example, FIG. 22 illustrates one exemplary embodiment of a second arm assembly 400 that may be provided with additional embodiments of the roll tarp system 10. The prime symbol is utilized in FIG. 22 to indicate elements of second arm assembly 400 which may be similar but may not be identical to elements of roll tarp system 10. Referring to FIG. 22, the second arm assembly 400 includes a rigid arm section 17' and a bearing section 402. The bearing section 402 of second arm assembly 400 provides for free rotation of the roll tube 14' relative to the second arm assembly 400. In this manner, the second arm assembly 400 may be located at an opposite end of the roll tube 14' from an arm assembly including an actuator 18 and the actuator can rotate the roll tube 14' without resistance from the second arm assembly. The illustrated embodiment of second arm assembly 400 includes a coupler 28' and groove 35' for use in engaging the second arm assembly 400 with a manually operated device, such as for example crank 127 to provide for the manual operation of the roll tarp system. The manual crank 127 in exemplary embodiments, that include a second arm assembly 400, the second arm assembly 400 can serve to increase the biasing force urging the roll tarp system towards the closed position as the second arm assembly 400 acts in concert with the first arm assembly of the roll tarp system 10.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably, connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

Further, while various inventive aspects, concepts and features of the general inventive concepts are described and illustrated herein in the context of various exemplary embodiments, these various aspects, concepts and features may be used in many alternative embodiments, either individually or in various combinations and sub-combinations thereof. Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to foam, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A roll tarp system comprising:
   a container having two sides, a first end, a second end, a bottom and an open top;
   a roll pipe;
   a tarp, wherein a first side of the tarp is secured to a first side of the container and a second side of the tarp is secured to the roll pipe;
   a power mechanism operably connected with the roll pipe for rolling the rotating the roll pipe for rolling the roll pipe from a closed position in which the tarp covers the open top to an open position in which the open top is exposed; and
   at least one flexible assembly, wherein one end of the flexible arm assembly is attached to the container and a second end of the flexible arm assembly is connected to the power mechanism;
   wherein the flexible arm assembly biases the roll pipe toward the closed position when the roll pipe is in the open position.

2. The roll tarp system of claim 1, wherein the arm assembly comprises an arm mount connected to the container, a flexible arm portion connected to the aim mount, and a rigid arm portion connected between the flexible arm portion and the power mechanism.

3. The roll tarp system of claim 1, wherein the arm assembly comprises an arm mount connected to the container, and a flexible arm portion connected between the arm mount and the power mechanism.

4. The roll tarp system of claim 1, further comprising a second flexible arm assembly.

5. The roll tarp system of claim 4, wherein one end of the second flexible arm assembly is attached to the container and a second end of the flexible arm assembly is connected to the roll pipe.

6. The roll tarp system of claim 4, wherein one end of the second flexible arm assembly is attached to the container and a second end of the flexible arm assembly is connected to a second power mechanism.

7. The roll tarp system of claim 1, wherein at least a portion of the at least one flexible arm assembly is a composite material.

8. The roll tarp system of claim 1, further comprising at least one roll return system, for biasing the roll pipe toward the closed position when the roll pipe is in the open position.

9. The roll tarp system of claim 8, wherein the at least one roll return system comprises a housing and at least one elongate member, wherein one end of the elongate member is attached to the housing of the at least one roll return system and a second end of the elongate member is connected to the roll pipe for biasing the roll pipe toward the closed position when the roll pipe is in the open position.

10. The roll tarp system of claim 9, wherein the at least one elongate member is connected to the roll pipe by an attachment element that is free to rotate relative to the roll pipe.

11. The roll tarp system of claim 10, wherein the at least one roll return system comprises at least one roller mounted within the housing to provide for smooth release and return of the elongate member relative to the housing.

12. The roll tarp of claim 11, wherein the at least one roll return system comprising at least one roller mounted to a portion of the container to prevent the rubbing of the elongate member against the container.

13. A roll tarp system, comprising:
a container having two sides, a first end, a second end, a bottom and an open top;
a roll pipe;
a tarp, wherein a first side of the tarp is secured to a first side of the container and a second side of the tarp is secured to the roll pipe;
a power mechanism for rolling the roll pipe from a closed position in which the tarp covers the open top to an open position in which the open top is exposed; and
an arm assembly connected between the container and the power mechanism;
wherein the roll pipe is rotatably disengageable from the power mechanism by operator manipulation of a release mechanism; and
wherein the arm assembly comprises an arm mount connected to the container, a flexible arm portion connected to the arm mount, and a rigid arm portion connected between the flexible arm portion and the power mechanism, and wherein the flexible arm portion biases the roll pipe toward the closed position when the roll pipe is in the open position.

14. A roll tarp system, comprising:
a container having two sides, a first end, a second end, a bottom and an open top;
a roll pipe;
a tarp, wherein a first side of the tarp is secured to a first side of the container and a second side of the tarp is secured to the roll pipe;
a power mechanism for rolling the roll pipe from a closed position in which the tarp covers the open top to an open position in which the open top is exposed; and
an arm assembly connected between the container and the power mechanism;
wherein the roll pipe is rotatably disengageable from the power mechanism by operator manipulation of a release mechanism; and
wherein the arm assembly comprises an arm mount connected to the container, and a flexible arm portion connected between the aim mount and the power mechanism, wherein the flexible arm portion biases the roll pipe toward the closed position when the roll pipe is in the open position.

15. A roll tarp system, comprising:
a container having two sides, a first end, a second end, a bottom and an open top;
a roll pipe;
a tarp, wherein a first side of the tarp is secured to a first side of the container and a second side of the tarp is secured to the roll pipe;
a power mechanism for rolling the roll pipe from a closed position in which the tarp covers the open top to an open position in which the open top is exposed; and
an arm assembly connected between the container and the power mechanism;
wherein the roll pipe is rotatably disengageable from the power mechanism by operator manipulation of a release mechanism; and
wherein at least a portion of the arm assembly is a composite material.

16. A roll tarp system for providing coverage to stored and transported goods, the system comprising:
a container having two sides, a first end, a second end, a bottom and an open top;
a roll pipe;
a tarp, wherein a first side of the tarp is secured to a first side of the container and a second side of the tarp is secured to the roll pipe;
a power mechanism for rolling the roll pipe from a closed position in which the tarp covers the open top to an open position in which the open top is exposed; and
at least one assembly including a flexible arm portion, wherein one end of the flexible arm assembly is attached to the container and a second end of the flexible arm assembly is connected to the power mechanism; and
wherein the flexible arm portion of the at least one arm assembly includes a plurality of arm leaves and biases the roll pipe toward the closed position when the roll pipe is in the open position.

17. The roll tarp system of claim 16, wherein at least one of the plurality of arm leaves are constructed from fiberglass.

18. The roll tarp system of claim 16, wherein the at least one arm assembly comprises an arm mount connected to the container, the flexible arm portion being connected to the arm mount, and a rigid arm portion connected between the flexible arm portion and the power mechanism.

19. The roll tarp system of claim 16, wherein the at least one arm assembly comprises an arm mount connected to the container, the flexible arm portion being connected between the arm mount and the power mechanism.

20. The roll tarp system of claim 16, further comprising at least one roll return system, for biasing the roll pipe toward the closed position when the roll pipe is in the open position.

21. The roll tarp system of claim 20, wherein the at least one roll return system comprises a housing and at least one elongate member, wherein one end of the elongate member is attached to the housing of the at least one roll return system and a second end of the elongate member is connected to the roll pipe for biasing the roll pipe toward the closed position when the roll pipe is in the open position.

22. The roll tarp system of claim 21, wherein the at least one elongate member is connected to the roll pipe by an attachment element that is free to rotate relative to the roll pipe.

23. The roll tarp system of claim 21, wherein the at least one roll return system comprises at least one roller mounted within the housing to provide for smooth release and return of the elongate member relative to the housing.

24. The roll tarp of claim 23, wherein the at least one roll return system comprising at least one roller mounted to a portion of the container to prevent the rubbing of the elongate member against the container.

* * * * *